US011176910B2

(12) United States Patent
Giusti et al.

(10) Patent No.: US 11,176,910 B2
(45) Date of Patent: Nov. 16, 2021

(54) SMARTPHONE PROVIDING RADAR-BASED PROXEMIC CONTEXT

(71) Applicant: Google LLC, Mountain View, CA (US)

(72) Inventors: Leonardo Giusti, San Francisco, CA (US); Ivan Poupyrev, Sunnyvale, CA (US); Brandon Barbello, Mountain View, CA (US); Patrick M. Amihood, Palo Alto, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/986,062

(22) Filed: Aug. 5, 2020

(65) Prior Publication Data
US 2020/0372879 A1 Nov. 26, 2020

Related U.S. Application Data

(63) Continuation of application No. 16/109,534, filed on Aug. 22, 2018, now Pat. No. 10,770,035.

(51) Int. Cl.
*G01S 7/41* (2006.01)
*G09G 5/38* (2006.01)
(Continued)

(52) U.S. Cl.
CPC ............. *G09G 5/38* (2013.01); *G01S 7/41* (2013.01); *G01S 13/42* (2013.01); *G06F 3/017* (2013.01);
(Continued)

(58) Field of Classification Search
CPC . G01S 7/41; G01S 7/412; G01S 7/417; G01S 13/42; G06F 3/011; G06F 3/017;
(Continued)

(56) References Cited

U.S. PATENT DOCUMENTS 6,971,072 B1 11/2005 Stein
7,924,212 B2 4/2011 Benitez et al.
(Continued)

FOREIGN PATENT DOCUMENTS

CN 102906623 1/2013
CN 103858073 6/2014
(Continued)

OTHER PUBLICATIONS

"Foreign Office Action", TW Application No. 108123886, dated Mar. 5, 2021, 21 pages.
(Continued)

Primary Examiner — Mihir K Rayan
(74) Attorney, Agent, or Firm — Colby Nipper PLLC

(57) ABSTRACT

This document describes techniques and systems that enable a smartphone providing radar-based proxemic context. The techniques and systems use a radar field to accurately determine a user's location and/or physical orientation with respect to an electronic device, such as a smartphone. The radar field also enables the device to receive 3D gestures from the user to interact with the device. The techniques allow the device to provide functionality based on the user's presence and/or orientation, and to appropriately adjust the timing, content, and format of the device's interactions with the user.

20 Claims, 26 Drawing Sheets

(51) Int. Cl.
  *G01S 13/42* (2006.01)
  *G06F 3/01* (2006.01)
  *H04M 1/724* (2021.01)

(52) U.S. Cl.
  CPC .... *H04M 1/724* (2021.01); *G09G 2340/0492* (2013.01); *G09G 2354/00* (2013.01)

(58) Field of Classification Search
  CPC ...... G06K 9/2018; G06K 9/3208; G09G 5/38; G09G 2340/0492; G09G 2354/00; H04M 1/724; H04M 1/72454
  See application file for complete search history.

(56) References Cited

U.S. PATENT DOCUMENTS

| | | | |
|---|---|---|---|
| 8,260,368 | B2 | 9/2012 | Yin |
| 8,560,128 | B2 | 10/2013 | Ruff et al. |
| 8,723,986 | B1 | 5/2014 | Merrill |
| 8,803,697 | B2* | 8/2014 | Rautiainen ............ H04M 19/04 340/670 |
| 8,837,696 | B2 | 9/2014 | Meriaz et al. |
| 9,075,435 | B1* | 7/2015 | Noble ............... H04M 1/72454 |
| 9,569,003 | B2 | 2/2017 | Rofougaran et al. |
| 9,589,565 | B2 | 3/2017 | Boies et al. |
| 9,600,177 | B2 | 3/2017 | Iyer et al. |
| 9,632,584 | B2 | 4/2017 | Dodge |
| 9,747,072 | B2 | 8/2017 | Noble et al. |
| 9,811,164 | B2 | 11/2017 | Poupyrev |
| 9,921,657 | B2 | 3/2018 | Sprenger et al. |
| 10,217,488 | B1 | 2/2019 | Huang |
| 10,698,603 | B2 | 6/2020 | Giusti et al. |
| 10,761,611 | B2 | 9/2020 | Giusti et al. |
| 10,770,035 | B2 | 9/2020 | Giusti et al. |
| 10,788,880 | B2 | 9/2020 | Giusti et al. |
| 10,890,653 | B2 | 1/2021 | Giusti |
| 10,930,251 | B2 | 2/2021 | Giusti et al. |
| 10,936,185 | B2 | 3/2021 | Giusti et al. |
| 2004/0100497 | A1* | 5/2004 | Quillen ............... G06F 3/04812 715/751 |
| 2005/0002530 | A1 | 1/2005 | Kogan |
| 2005/0128124 | A1 | 6/2005 | Greneker et al. |
| 2005/0242984 | A1 | 11/2005 | Waters |
| 2007/0015559 | A1 | 1/2007 | Zalewski et al. |
| 2007/0117625 | A1 | 5/2007 | Marks et al. |
| 2007/0202858 | A1 | 8/2007 | Yu |
| 2008/0029316 | A1 | 2/2008 | Jaeger et al. |
| 2008/0055105 | A1 | 3/2008 | Blum et al. |
| 2009/0228841 | A1 | 9/2009 | Hildreth |
| 2009/0237371 | A1 | 9/2009 | Kim |
| 2009/0322690 | A1 | 12/2009 | Hiltunen et al. |
| 2010/0017722 | A1 | 1/2010 | Cohen |
| 2011/0181509 | A1 | 7/2011 | Rautiainen et al. |
| 2011/0181510 | A1 | 7/2011 | Hakala et al. |
| 2011/0221667 | A1 | 9/2011 | Lee |
| 2011/0237274 | A1 | 9/2011 | Wong et al. |
| 2011/0313768 | A1 | 12/2011 | Klein et al. |
| 2012/0280900 | A1 | 11/2012 | Wang et al. |
| 2013/0023248 | A1 | 1/2013 | Lee |
| 2013/0053007 | A1 | 2/2013 | Cosman et al. |
| 2013/0057571 | A1 | 3/2013 | Harris |
| 2013/0120458 | A1 | 5/2013 | Celebisoy et al. |
| 2013/0241823 | A1 | 9/2013 | Pryor |
| 2013/0300671 | A1 | 11/2013 | Hallerström Sjöstedt et al. |
| 2014/0267130 | A1 | 9/2014 | Hwang et al. |
| 2014/0315531 | A1 | 10/2014 | Joong et al. |
| 2014/0347188 | A1* | 11/2014 | Alameh ............... G06F 1/1694 340/686.6 |
| 2014/0379341 | A1 | 12/2014 | Seo et al. |
| 2014/0380249 | A1 | 12/2014 | Fleizach |
| 2015/0036999 | A1 | 2/2015 | Batur et al. |
| 2015/0145993 | A1 | 5/2015 | Scalisi |
| 2015/0186569 | A1* | 7/2015 | Sekine ............... G06F 30/20 703/2 |
| 2015/0187137 | A1 | 7/2015 | Mullins |
| 2015/0277569 | A1 | 10/2015 | Sprenger et al. |
| 2015/0346820 | A1 | 12/2015 | Poupyrev et al. |
| 2015/0365540 | A1 | 12/2015 | Davis et al. |
| 2015/0370443 | A1 | 12/2015 | Ben-Bassat |
| 2015/0370472 | A1 | 12/2015 | Privault et al. |
| 2016/0026327 | A1 | 1/2016 | Park et al. |
| 2016/0041617 | A1 | 2/2016 | Poupyrev |
| 2016/0041618 | A1 | 2/2016 | Poupyrev |
| 2016/0054803 | A1 | 2/2016 | Poupyrev |
| 2016/0062590 | A1 | 3/2016 | Karunamuni et al. |
| 2016/0098089 | A1 | 4/2016 | Poupyrev |
| 2016/0140763 | A1 | 5/2016 | Seichter et al. |
| 2016/0162145 | A1 | 6/2016 | Rivers et al. |
| 2016/0234369 | A1 | 8/2016 | Jung et al. |
| 2016/0241720 | A1 | 8/2016 | Cheatham et al. |
| 2016/0252607 | A1 | 9/2016 | Saboo et al. |
| 2016/0259037 | A1 | 9/2016 | Molchanov et al. |
| 2016/0358588 | A1 | 12/2016 | O'Neill |
| 2017/0040002 | A1* | 2/2017 | Basson ............... G06F 21/84 |
| 2017/0097413 | A1 | 4/2017 | Gillian et al. |
| 2017/0235458 | A1 | 8/2017 | Tsurumi |
| 2017/0289766 | A1 | 10/2017 | Scott et al. |
| 2017/0289954 | A1 | 10/2017 | Mese et al. |
| 2017/0308131 | A1 | 10/2017 | Geva |
| 2017/0328917 | A1 | 11/2017 | Silverstein et al. |
| 2017/0329449 | A1 | 11/2017 | Silverstein et al. |
| 2017/0349184 | A1 | 12/2017 | Tzirkel-Hancock et al. |
| 2018/0018965 | A1 | 1/2018 | Daley |
| 2018/0032997 | A1 | 2/2018 | Gordon et al. |
| 2018/0098351 | A1 | 4/2018 | Amel et al. |
| 2018/0120946 | A1 | 5/2018 | Cho |
| 2018/0224980 | A1 | 8/2018 | Avila et al. |
| 2018/0329049 | A1 | 11/2018 | Amihood et al. |
| 2018/0374143 | A1 | 12/2018 | Williamson et al. |
| 2019/0286912 | A1 | 9/2019 | Chan et al. |
| 2020/0057504 | A1 | 2/2020 | Lien et al. |
| 2020/0064445 | A1 | 2/2020 | Amihood et al. |
| 2020/0064458 | A1 | 2/2020 | Giusti et al. |
| 2020/0064996 | A1 | 2/2020 | Giusti et al. |
| 2020/0066236 | A1 | 2/2020 | Giusti et al. |
| 2020/0125158 | A1 | 4/2020 | Giusti et al. |
| 2020/0150771 | A1 | 5/2020 | Giusti et al. |
| 2020/0193942 | A1 | 6/2020 | Giusti et al. |
| 2020/0272322 | A1 | 8/2020 | Zhu et al. |
| 2020/0285383 | A1 | 9/2020 | Giusti et al. |
| 2021/0026434 | A1 | 1/2021 | Giusti et al. |
| 2021/0072370 | A1 | 3/2021 | Giusti et al. |
| 2021/0132788 | A1 | 5/2021 | Giusti et al. |

FOREIGN PATENT DOCUMENTS

| | | |
|---|---|---|
| CN | 204145834 | 2/2015 |
| CN | 104793731 | 7/2015 |
| CN | 105264461 | 1/2016 |
| CN | 108334199 | 7/2017 |
| CN | 107077169 | 8/2017 |
| CN | 107765846 | 3/2018 |
| EP | 1309211 | 5/2003 |
| EP | 2560145 | 2/2013 |
| EP | 2637079 | 9/2013 |
| EP | 2887092 | 6/2015 |
| GB | 2554957 | 4/2018 |
| JP | H11338120 | 12/1999 |
| JP | 2001033550 | 2/2001 |
| JP | 2006013819 | 1/2006 |
| JP | 2010038607 | 2/2010 |
| JP | 2012048720 | 3/2012 |
| JP | 2013125328 | 6/2013 |
| JP | 2014197317 | 10/2014 |
| JP | 2015141588 | 8/2015 |
| JP | 2016205907 | 12/2016 |
| JP | 2017111711 | 6/2017 |
| JP | 2018116653 | 7/2018 |
| JP | 2018527558 | 9/2018 |
| KR | 20160128318 | 11/2016 |
| KR | 20160148640 | 12/2016 |
| TW | 201228332 | 7/2012 |
| TW | 201445029 | 12/2014 |
| TW | 201606572 | 2/2016 |

(56) References Cited

FOREIGN PATENT DOCUMENTS

| TW | I610084 | 3/2016 |
|---|---|---|
| TW | 201727439 | 8/2017 |
| WO | 2011149659 | 12/2011 |
| WO | 2016017978 | 2/2016 |
| WO | 2018004757 | 1/2018 |
| WO | 2018118895 | 6/2018 |
| WO | 2018208958 | 11/2018 |
| WO | 2020040966 | 2/2020 |
| WO | 2020040968 | 2/2020 |
| WO | 2020040970 | 2/2020 |
| WO | 2020086215 | 4/2020 |
| WO | 2020101810 | 5/2020 |

OTHER PUBLICATIONS

"International Preliminary Report on Patentability", Application No. PCT/US2019/045142, dated Feb. 23, 2021, 11 pages.
"International Preliminary Report on Patentability", Application No. PCT/US2019/045144, dated Feb. 23, 2021, 11 pages.
"International Preliminary Report on Patentability", Application No. PCT/US2019/045128, dated Mar. 2, 2021, 15 pages.
"International Preliminary Report on Patentability", Application No. PCT/US2019/053602, dated Apr. 27, 2021, 15 pages.
"Corrected Notice of Allowance", U.S. Appl. No. 16/884,943, dated Jan. 26, 2021, 2 pages.
"Corrected Notice of Allowance", U.S. Appl. No. 16/802,024, dated Jan. 28, 2021, 2 pages.
"Corrected Notice of Allowance", U.S. Appl. No. 16/108,815, dated Dec. 8, 2020, 2 pages.
"Corrected Notice of Allowance", U.S. Appl. No. 16/108,815, dated Dec. 17, 2020, 2 pages.
"Corrected Notice of Allowance", U.S. Appl. No. 16/802,024, dated Dec. 23, 2020, 3 pages.
"Foreign Office Action", JP Application No. 2020520030, dated Jan. 12, 2021, 11 pages.
"Foreign Office Action", JP Application No. 2020-090667, dated Nov. 17, 2020, 6 pages.
"Foreign Office Action", TW Application No. 108123712, dated Dec. 22, 2020, 2 pages.
"Notice of Allowance", U.S. Appl. No. 16/802,024, dated Dec. 11, 2020, 5 pages.
"Supplemental Notice of Allowance", U.S. Appl. No. 16/884,943, dated Dec. 7, 2020, 2 pages.
"Extended European Search Report", EP Application No. 20172743.5, dated Sep. 9, 2020, 11 pages.
"Foreign Office Action", CN Application No. 201980004742.2, dated Aug. 5, 2020, 16 pages.
"Foreign Office Action", TW Application No. 108123886, dated Aug. 26, 2020, 14 pages.
"Foreign Office Action", EP Application No. 19755482.7, dated Sep. 15, 2020, 11 pages.
"Foreign Office Action", TW Application No. 108123712, dated Aug. 17, 2020, 7 pages.
"Non-Final Office Action", U.S. Appl. No. 16/802,024, dated Oct. 7, 2020, 10 Pages.
"Notice of Allowance", U.S. Appl. No. 16/108,815, dated Sep. 15, 2020, 7 Pages.
"Notice of Allowance", U.S. Appl. No. 16/884,943, dated Oct. 28, 2020, 11 pages.
"EP Appeal Decision", European Application No. 10194359.5, dated May 28, 2019, 20 pages.
"First Action Interview Office Action", U.S. Appl. No. 16/189,346, dated Jan. 14, 2020, 3 Pages.
"First Action Interview Office Action", U.S. Appl. No. 16/109,534, dated Mar. 17, 2020, 3 Pages.
"Foreign Office Action", European Application No. 19755482.7, dated Jun. 17, 2020, 4 pages.
"Foreign Office Action", Korean Application No. 1020207008514, dated May 15, 2020, 6 pages.
"Foreign Office Action", Taiwanese Application No. 108123887, dated Jul. 15, 2020, 8 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Search Report and Written Opinion", PCT Application No. PCT/US2019/045128, dated Jan. 14, 2020, 22 pages.
"International Search Report and Written Opinion", PCT Application No. PCT/US2019/045144, dated Jan. 2, 2020, 18 pages.
"International Search Report and Written Opinion", PCT Application No. PCT/US2019/053568, dated Dec. 20, 2019, 14 pages.
"International Search Report and Written Opinion", PCT Application No. PCT/US2019/053602, dated Dec. 6, 2019, 23 pages.
"International Search Report and Written Opinion", PCT Application No. PCT/US2019/045142, dated Feb. 10, 2020, 19 pages.
"Invitation to Pay Additional Fees", PCT Application No. PCT/US2019/045144, Oct. 28, 2019, 10 pages.
"Invitation to Pay Additional Fees", PCT Application No. PCT/US2019/045142, Oct. 29, 2019, 10 pages.
"Invitation to Pay Additional Fees", PCT Application No. PCT/US2019/045128, Nov. 11, 2019, 16 pages.
"Micropower Impulse Radar (MIR)", Ohio State et. al., retrieved from the internet: http:..web.cse.ohio-state.edu/siefast/nest/nest_webpage/posters/OSU-poster-alineinthestand-MIR.pdf, Sep. 1, 2003, 1 page.
"Non-Final Office Action", U.S. Appl. No. 16/112,130, dated Sep. 20, 2019, 14 Pages.
"Notice of Allowance", U.S. Appl. No. 16/112,130, dated Feb. 19, 2020, 8 Pages.
"Notice of Allowance", U.S. Appl. No. 16/189,346, dated Apr. 15, 2020, 6 Pages.
"Notice of Allowance", U.S. Appl. No. 16/109,534, dated Apr. 30, 2020, 5 Pages.
"Notice of Allowance", U.S. Appl. No. 16/166,900, dated May 15, 2020, 7 Pages.
"Position Sensors", https://developerandroid.com/guide/topics/sensors/sensors_position.html, downloaded Mar. 22, 2018, 5 pages.
"Pre-Interview Communication", U.S. Appl. No. 16/109,534, dated Feb. 19, 2020, 3 Pages.
"Pre-Interview Communication", U.S. Appl. No. 16/166,900, dated Mar. 19, 2020, 4 Pages.
"Pre-Interview Communication", U.S. Appl. No. 16/189,346, dated Dec. 13, 2019, 5 Pages.
"Pre-Interview Communication", U.S. Appl. No. 16/108,815, dated Jun. 8, 2020, 3 pages.
"Restriction Requirement", U.S. Appl. No. 16/109,534, dated Jan. 7, 2020, 6 Pages.
"Samsung Galaxy S4 Air Gestures", Video retrieved from https://www.youtube.com/watch?v=375Hb87yGcg, May 7, 2013, 4 pages.
Cravotta, "Optimizing Proximity Sensing for Consumer Electronics Applications", Apr. 26, 2012, 7 pages.
Lien, et al., "Soli: Ubiquitous Gesture Sensing with Millimeter Wave Radar", ACM Trans. Graph., vol. 35, No. 4, Article 142, Jul. 1, 2016, 19 pages.
Paulson, et al., "Ultra-Wideband Radar Methods and Techniques of Medical Sensing and Imaging", SPIE, PO Box 10 Bellingham, Wa, 98227-0010, USA, Sep. 2, 2003, XP040212116, 2005, 12 pages.
"Foreign Office Action", KR Application No. 10-2020-7013505, dated Jul. 5, 2021, 6 pages.
"Foreign Office Action", KR Application No. 10-2020-7033558, dated Jul. 5, 2021, 6 pages.
"Foreign Office Action", IN Application No. 202047011909, dated Aug. 4, 2021, 6 pages.
"Non-Final Office Action", U.S. Appl. No. 17/035,059, dated Aug. 5, 2021, 6 pages.
"International Preliminary Report on Patentability", Application No. PCT/US2019/053568, dated May 18, 2021, 8 pages.
"Non-Final Office Action", U.S. Appl. No. 17/148,414, dated Jul. 2, 2021, 10 pages.
"Foreign Notice of Allowance", KR Application No. 10-2020-7033558, dated Sep. 6, 2021, 2 pages.
"Foreign Office Action", TW Application No. 108123886, dated Jul. 29, 2021, 9 pages.

(56) References Cited

OTHER PUBLICATIONS

"Non-Final Office Action", U.S. Appl. No. 16/950,248, dated Sep. 22, 2021, 15 pages.
"Notice of Allowance", U.S. Appl. No. 17/148,414, dated Sep. 14, 2021, 12 pages.

* cited by examiner

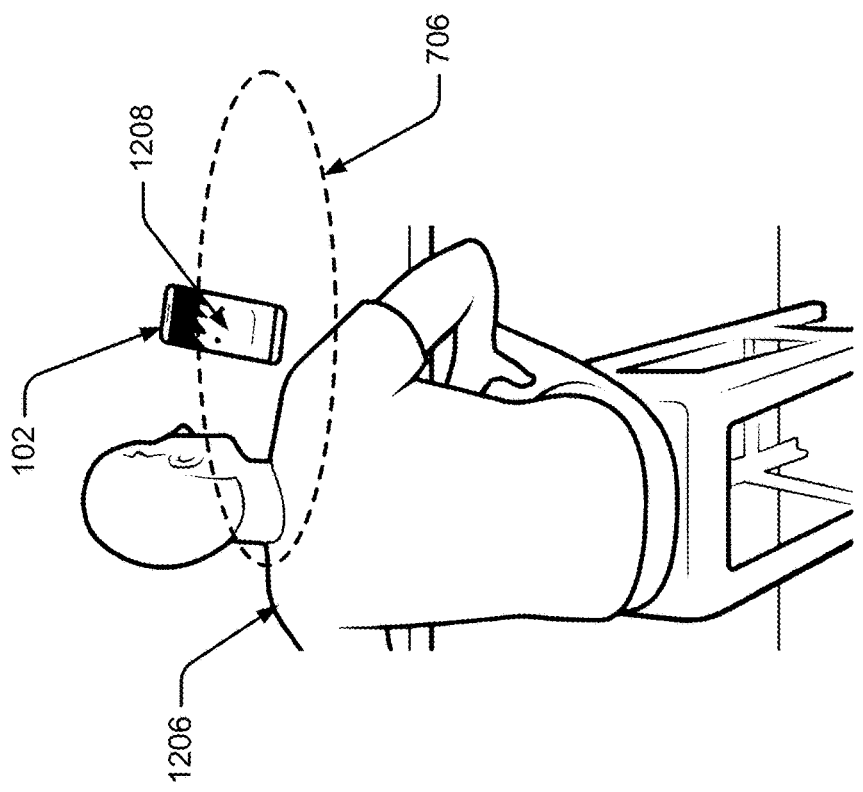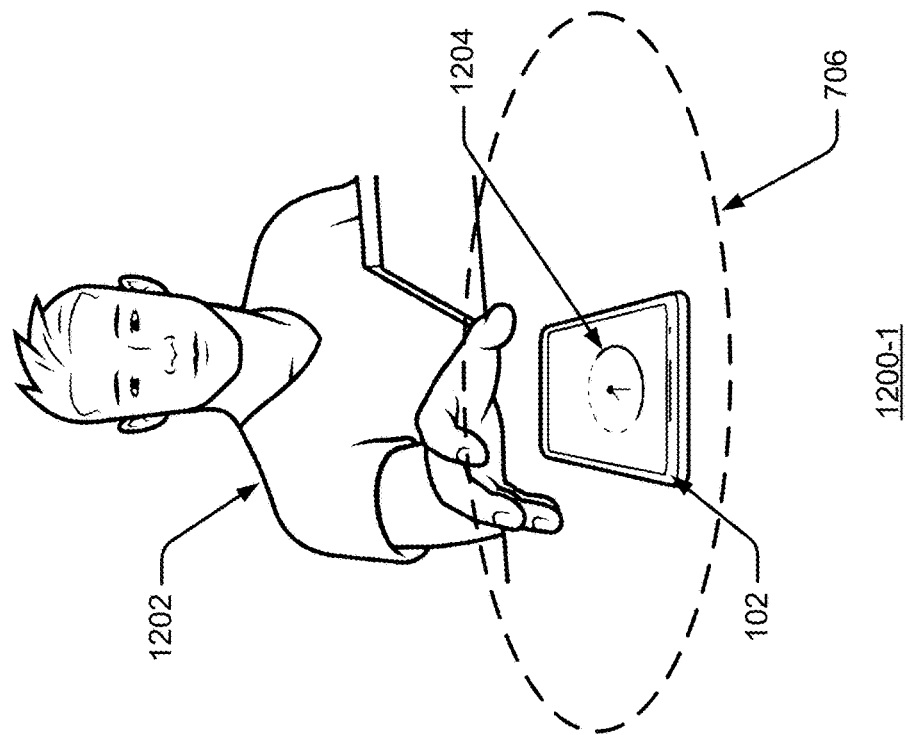
FIG. 12

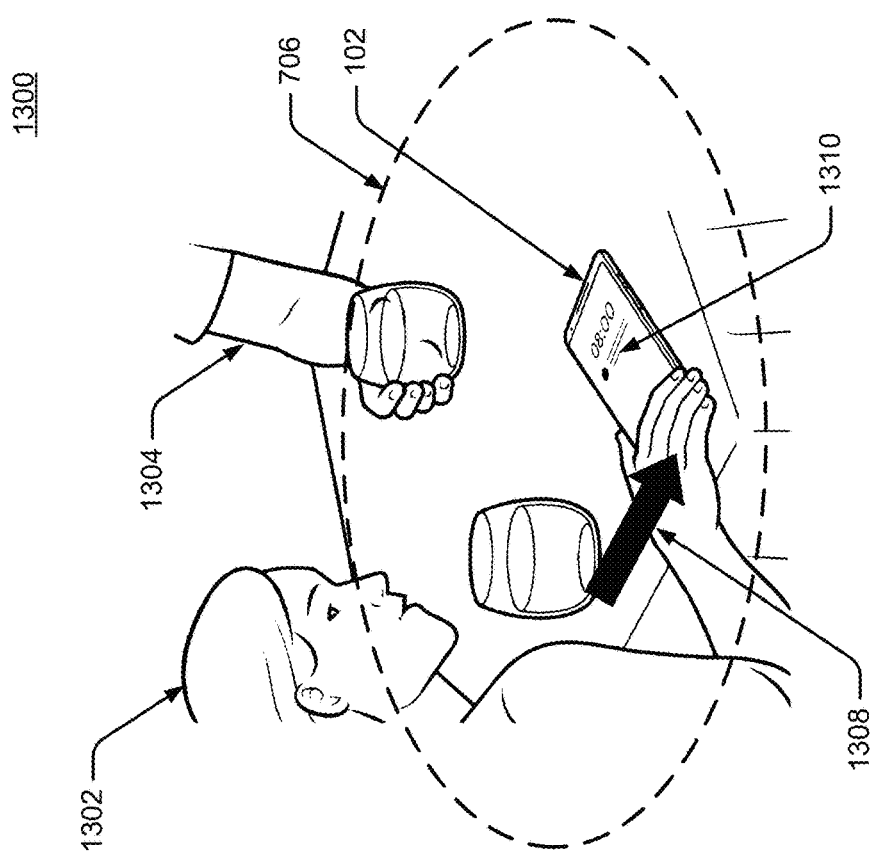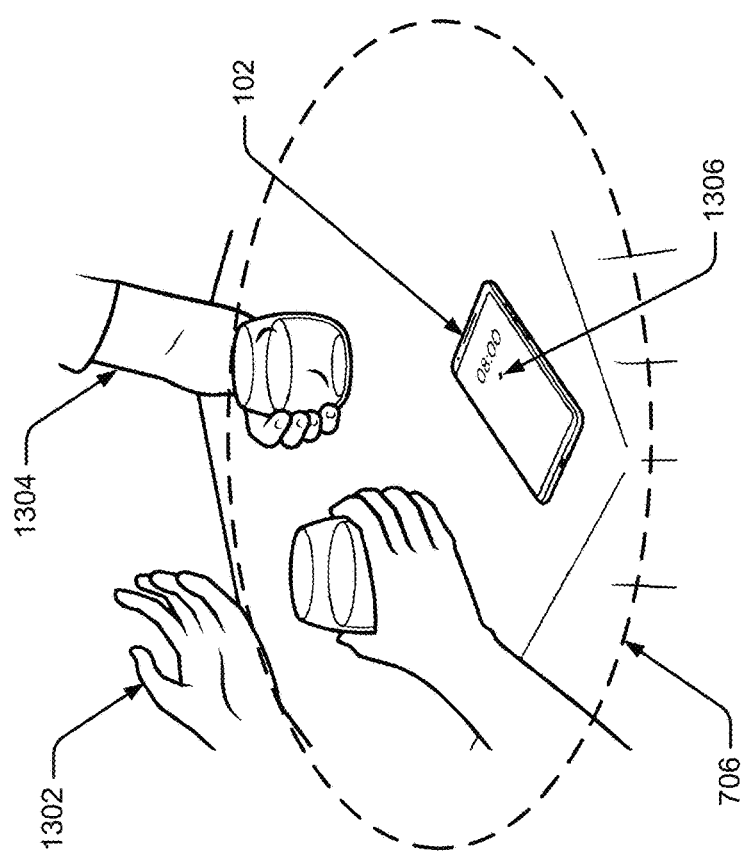
FIG. 13

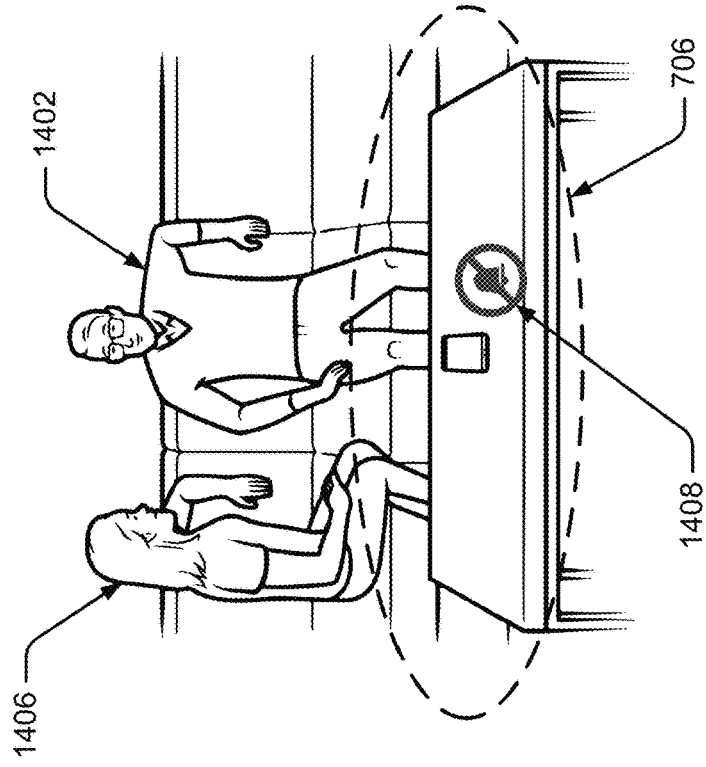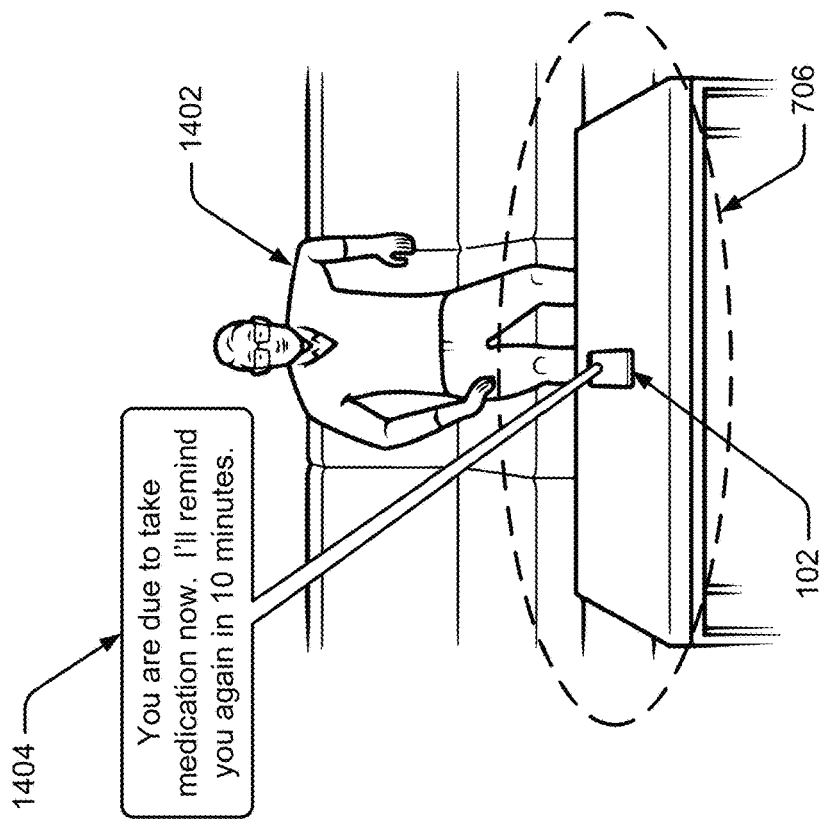
FIG. 14

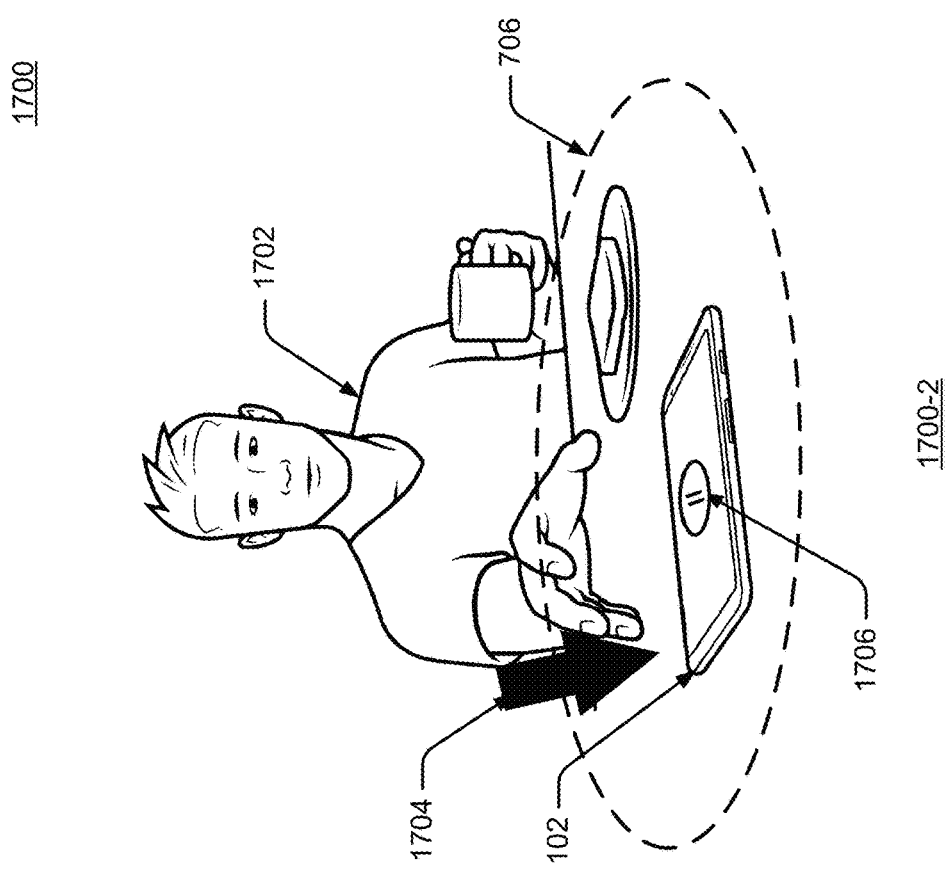
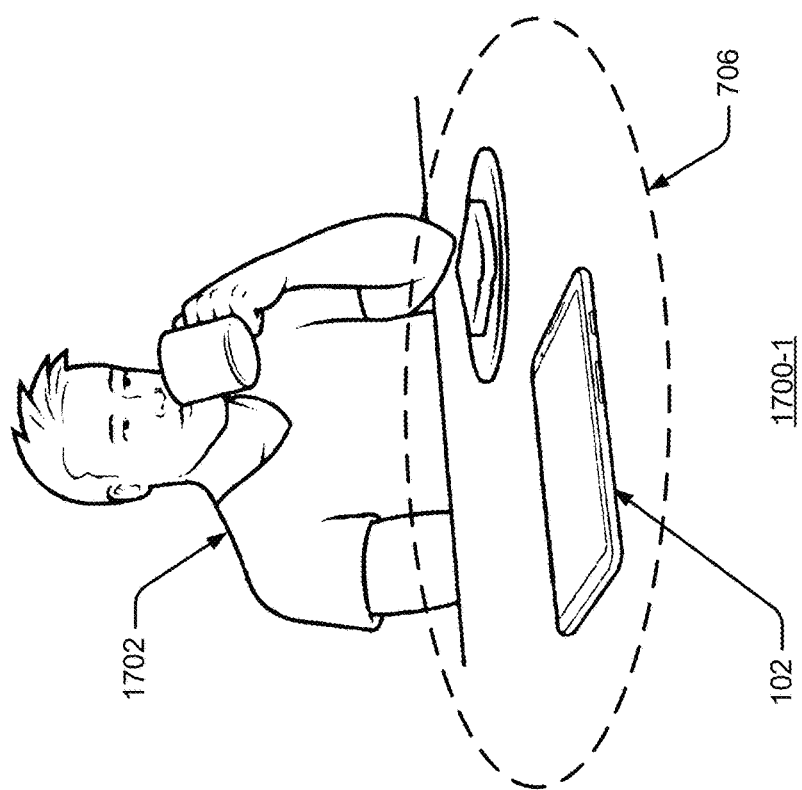
FIG. 17

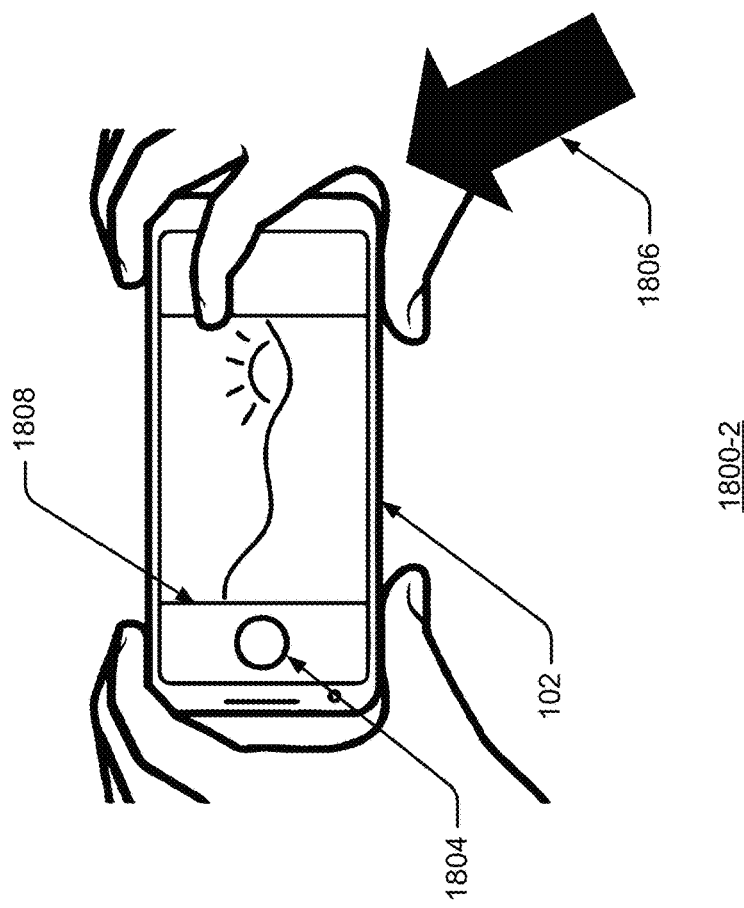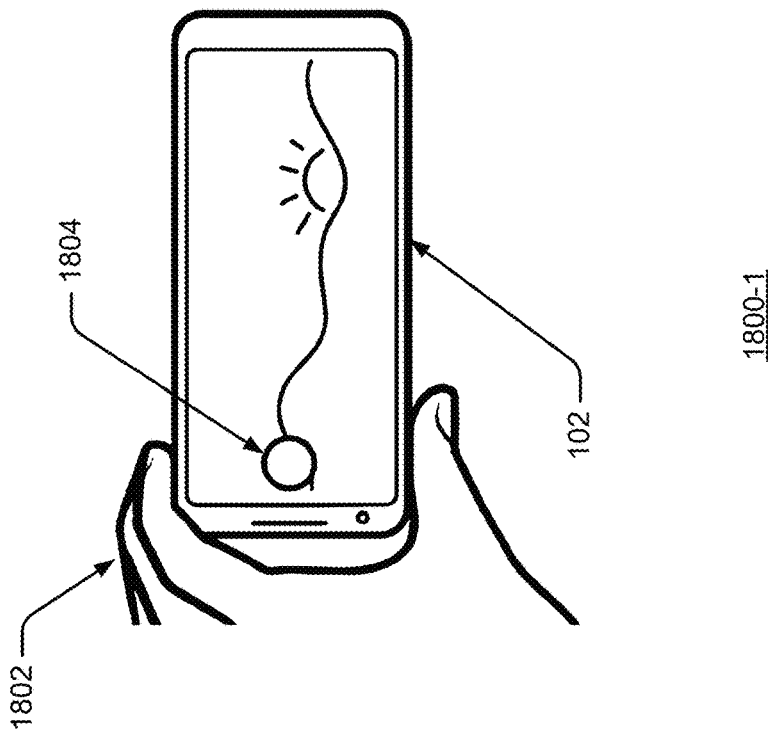
FIG. 18

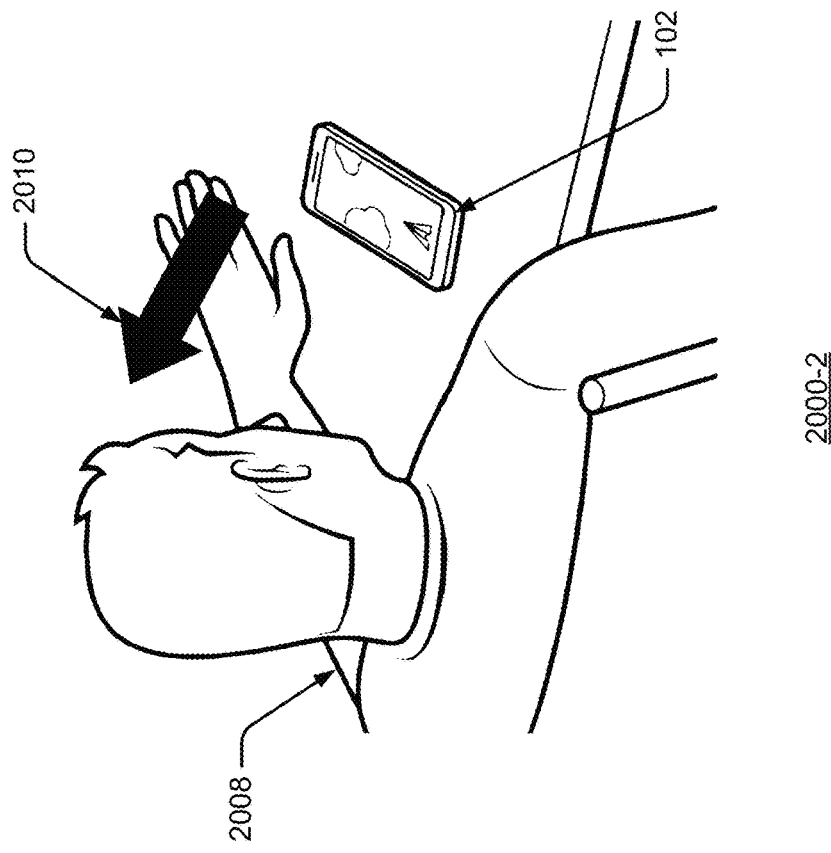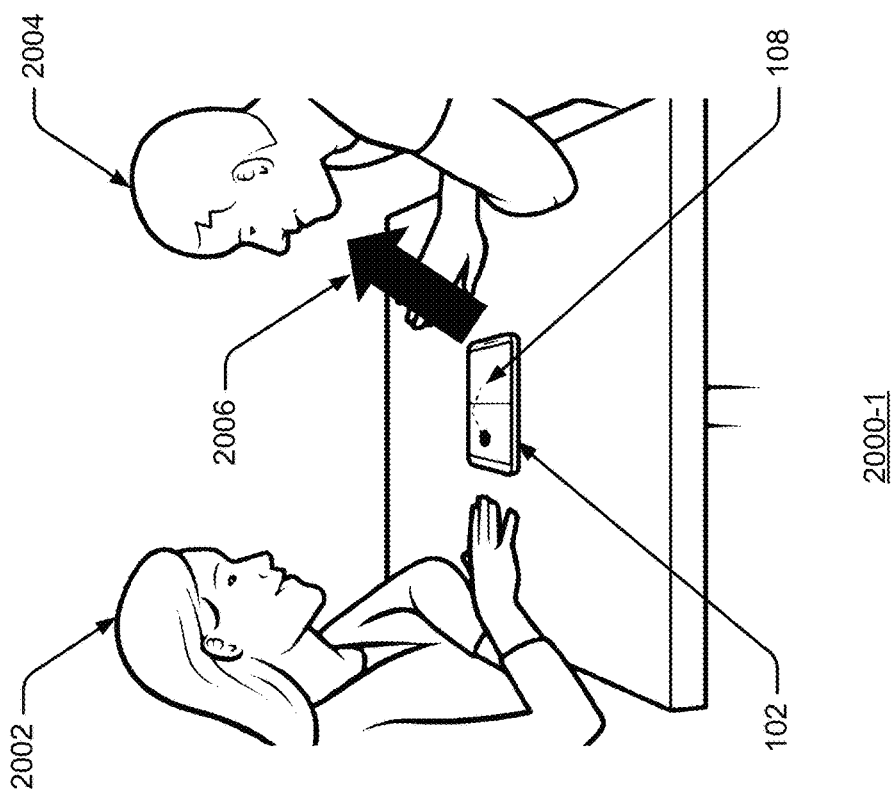
FIG. 20

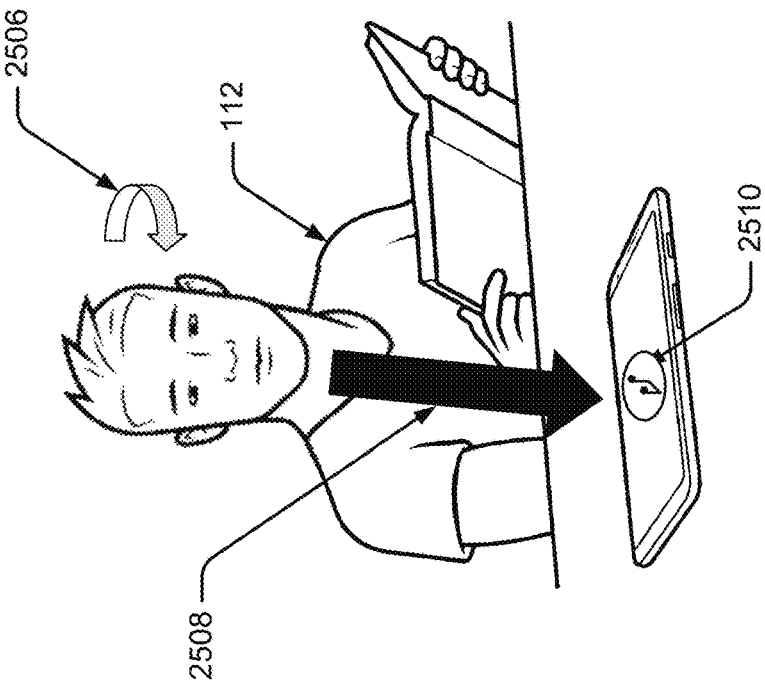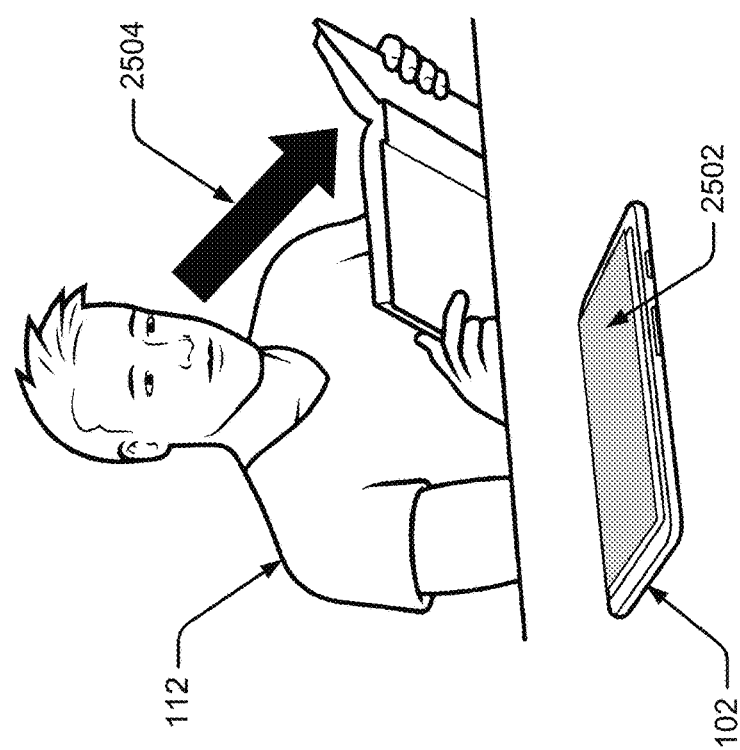
FIG. 25

SMARTPHONE PROVIDING RADAR-BASED PROXEMIC CONTEXT

RELATED APPLICATION

This application is a continuation application of U.S. patent application Ser. No. 16/109,534, filed on Aug. 22, 2018, the disclosure of which is incorporated by reference herein in its entirety.

BACKGROUND

The applications on smartphones and other electronic devices provide an ever-increasing variety of productivity, entertainment, and communication features that have become nearly essential. We listen to music, watch videos, and share presentations and documents. These applications remind us of appointments (and sometimes even schedule the appointments), notify us when someone texts or calls, and keep track of projects at work, school, and home. Further, as these applications, and the devices on which they run, become more familiar with our schedules and preferences, they suggest alternate traffic routes, suggest restaurants, and otherwise independently communicate with us. With all of the help our applications provide us, however, and for all their computing power and artificial intelligence, they are still socially unaware and can become intrusive. That is, however "smart" a smartphone is, it does not know what its user is doing (or whether the user is even near the device) when a reminder, alert, or suggestion is displayed or played. Thus, if we move to the other side of the device, or try to share displayed content with another person across a table, the content may be upside down. If we rotate the device, it may not recognize what we want it to do until we pick the device up, orient it how we want it, and put it down again. In other cases, the device may interrupt us at inconvenient times or display reminders or notifications, which may include personal and private information, at inappropriate locations or at an embarrassing volume or brightness. Consequently, taking advantage of the powerful and interesting features of our applications can be inconvenient, embarrassing, and frustrating, and we may not realize the full potential of our electronic devices and applications because of their limited awareness.

SUMMARY

This document describes techniques and systems that enable a smartphone providing radar-based proxemic context. The techniques and systems use a radar field to accurately determine a user's location and/or physical orientation with respect to an electronic device, such as a smartphone. The radar field also enables the device to receive three-dimensional (3D) gestures from the user to interact with the device. The techniques allow the device to provide functionality based on the user's presence and/or orientation, and to appropriately adjust the timing, content, and format of the device's interactions with the user.

Aspects described below include a system comprising a smartphone, a display, a radar system, one or more computer processors, and one or more computer-readable media. The radar system is implemented at least partially in hardware and provides a radar field. The radar system also senses reflections from an object in the radar field and analyzes the reflections from the object in the radar field. The radar system further provides, based on the analysis of the reflections, radar data. The one or more computer processors include stored instructions that can, when executed by the one or more computer processors, perform operations. The operations comprise determining, based on a first subset of the radar data, an orientation of the smartphone with reference to the object and, in response to determining the orientation of the smartphone, providing an orientation-based function of the smartphone. The operations also comprise determining, based on a second subset of the radar data, a change in the orientation of the smartphone with reference to the object and, in response to the change in orientation, modifying the orientation-based function of the smartphone.

Aspects described below also include a system comprising an electronic device, a radar system, one or more computer processors, and one or more computer-readable media. The radar system is implemented at least partially in hardware and provides a radar field. The radar system also senses reflections from an object in the radar field and analyzes the reflections from the object in the radar field. The radar system further provides, based on the analysis of the reflections, radar data. The one or more computer-readable media include stored instructions that, when executed by the one or more computer processors, perform operations. The operations comprise determining, based on a first subset of the radar data, a presence of the object within an awareness distance of the electronic device and, in response to determining the presence of the object within the awareness distance, providing a presence-based function of the electronic device. The operations also comprise determining, based on a second subset of the radar data, that the object is outside the awareness distance of the electronic device, and in response to determining that the object is outside the awareness distance, ceasing to provide the presence-based function.

Aspects described below also include a method, which is implemented in an electronic device that includes a radar system and a radar-based application. The method comprises providing, by the radar system, a radar field and sensing, by the radar system, reflections from an object in the radar field. The method also includes analyzing the reflections from the object in the radar field and providing, based on the analysis of the reflections, radar data. The method further includes determining, based on a first subset of the radar data, an orientation of the electronic device with reference to the object and providing, in response to determining the orientation of the electronic device, an orientation-based function of the electronic device. The method also includes determining, based on a second subset of the radar data, a change in the orientation of the electronic device with reference to the object and, in response to the change in orientation, modifying the orientation-based function of the electronic device.

Aspects described below also include a system comprising an electronic device that includes, or is associated with, means for providing a radar field that provides radar data, the radar data based on sensing and analyzing reflections from an object in the radar field. The system also includes means for determining an orientation of the electronic device with reference to the object in the radar field and providing, in response to determining the orientation, an orientation-based function of the electronic device. The system also includes means for determining a change in the orientation of the electronic device with reference to the object in the radar field and, in response to determining the change in orientation, modifying the orientation-based function of the electronic device.

This summary is provided to introduce simplified concepts concerning a smartphone providing radar-based proxemic context, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a smartphone providing radar-based proxemic context are described in this document with reference to the following drawings. The same numbers are used throughout the drawings to reference like features and components:

FIGS. 8-12 illustrate examples of presence-based functions that can be used with the smartphone providing radar-based proxemic context techniques, as described in FIG. 7.

FIGS. 13 and 14 illustrates examples of modifications to the presence-based functions as described in FIGS. 7-12.

FIG. 15-20 illustrate examples of 3D gestures that can be used with the smartphone providing radar-based proxemic context techniques, as described in FIGS. 7-14

FIGS. 23-25 illustrates example implementation of an electronic device that can implement additional details of the method of FIGS. 21 and 22.

DETAILED DESCRIPTION

Overview

Figure 1:
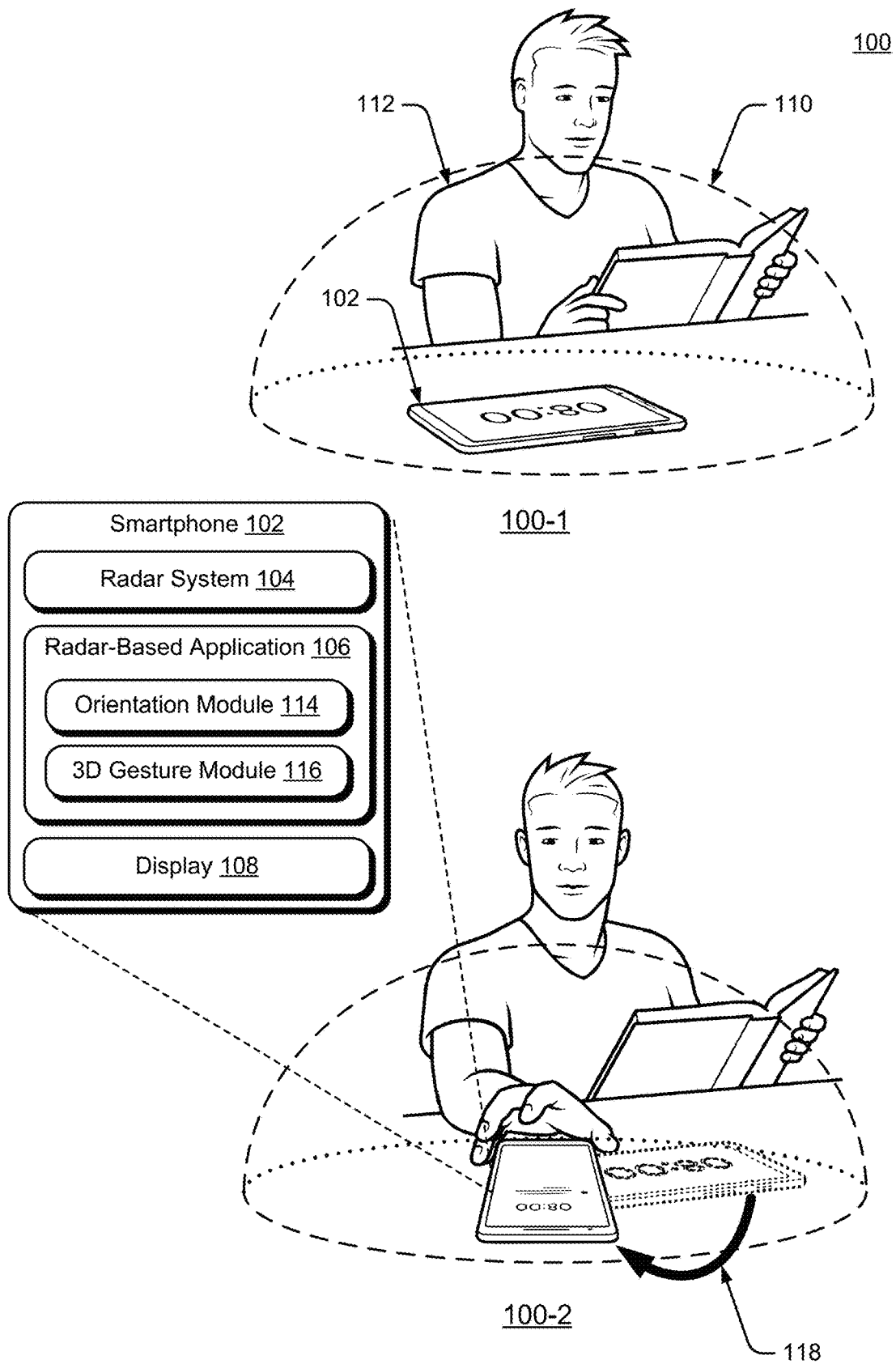
FIG. 1 illustrates an example environment in which techniques enabling a smartphone providing radar-based proxemic context can be implemented.

This document describes techniques and systems that enable a smartphone providing radar-based proxemic context. As noted, because smartphones and other electronic devices are not aware of whether a user is near the device, or how the user is positioned relative to the device (and the device's display), the devices may not always present content in a way that is convenient for the user. Further, and again because of the lack of awareness, the electronic devices may interrupt users by displaying reminders or notifications (which may also include personal and private information) at inappropriate or inconvenient times and places, or at an embarrassing volume. It can be frustrating and challenging to get the device properly oriented to display content (especially for multiple users) or to remember to put the device into a "silent" mode. Additionally, the users sometimes forget to turn off the silent mode, which can lead to missing important reminders. Thus, the users may not realize the full potential of their smartphones and other devices because of the device's limited recognition of its surroundings.

The described techniques and systems employ a radar system to accurately determine a user's location and physical orientation with respect to the electronic device. The radar field also enables the device to accurately determine three-dimensional (3D) gestures (e.g., a gesture that comprises one or more movements, in any direction, within a 3D space illuminated by the radar field 110) from the user, which can be used to interact with the device. Unless indicated otherwise by a particular context, increased accuracy refers to an increased degree of refinement, an increased conformity to truth, or both the increased degree of refinement and the increased conformity to truth. The techniques allow the device to provide functionality based on the user's presence and orientation, by appropriately orienting the display and adjusting the timing, content, and format of the device's interactions with the user. Thus, the described techniques and systems can improve the quality and effectiveness of the user's experience and thereby increase the user's efficiency, work flow, and enjoyment.

Consider an electronic device that includes a do-not-disturb (DND) feature that can be activated by orienting the electronic device in a particular way. For example, the DND feature may be activated by orienting a display of the device to face a surface on which the device is sitting. In this example, the electronic device is placed screen-side down to enter a mode in which the device does not provide interruptions, such as calendar reminders, email or text notifications, and so forth. This type of orientation-based DND mode typically prevents the user from even seeing a clock or timer on the screen (e.g., to remind the user when to exit the DND mode). Further, to exit the DND mode, the user must pick up the device, tilt it until the display orientation is correct, and then put it back down (which may alter the display orientation again). When there are multiple viewers, the orientation might still be wrong for some of them. Consistently inconvenient or frustrating interactions with orientation-based features such as the DND mode or the display orientation can reduce efficiency and the quality of the user's experience with orientation-based features, or even reduce the likelihood that the user will interact with those features.

Contrast these conventional techniques with the systems and techniques described in this document, which can improve efficiency and usability in several areas. For instance, in the example above, the user places the electronic device in the DND mode, and may have difficult exiting the DND mode in a simple and convenient manner. In this situation, the electronic device may include a radar system that can provide a radar field that extends into an area around the device (e.g., a five-, eight-, or thirteen-foot radius around the device). The radar sensors can use radar signals reflected from objects that enter the radar field to detect a presence and location of the user and an orientation of the device with reference to the user. The user can then enter the DND mode by turning the device, display facing up, to a particular orientation (e.g., a landscape orientation). In this situation, the user may exit the DND mode using a simple change in orientation, such as rotating the device to a portrait orientation. This easy movement can put the device in the proper orientation vis-à-vis the user, without the user having to pick up the device or tilt it, because the radar field allows the device to know the desired orientation, based on the position of the user.

In this way, the described techniques and systems allow simple and convenient interaction with orientation-based features. The user can enjoy the advantages and convenience of these features without the disruption and interruption that may result from trying to use orientation-based features without the described techniques. This can improve efficiency and reduce user frustration, such as having to adjust and re-adjust the orientation of the device to achieve the desired result, which increases the quality of the user experience.

This is but one example of how the techniques and devices described herein may be used to allow users to enjoy orientation- or presence-based features. Other examples and implementations of which are described throughout this document. The document now turns to an example environment, after which example systems, apparatuses, methods, and components are described.

Operating Environment

FIG. 1 illustrates an example environment 100 in which techniques enabling a smartphone providing radar-based proxemic context can be implemented. The example environment 100 includes a smartphone 102, which includes, or is associated with, a radar system 104 and a radar-based application 106. In some implementations, the smartphone 102 may include a display 108. Some implementations of the radar system 104 are particularly advantageous as applied in the context of smartphones, such as the smartphone 102, for which there is a convergence of issues such as a need for low power, a need for processing efficiency, limitations in a spacing and layout of antenna elements, and other issues, and are even further advantageous in the particular context of smartphones for which radar detection of fine hand gestures is desired. Although the embodiments are particularly advantageous in the described context of a smartphone for which fine radar-detected hand gestures is required, it is to be appreciated that the applicability of the features and advantages of the present invention is not necessarily so limited, and other embodiments involving other types of electronic devices may also be within the scope of the present teachings In the example environment 100, the radar system 104 provides a radar field 110 by transmitting one or more radar signals or waveforms as described below with reference to FIGS. 3-6. The radar field 110 is a volume of space from which the radar system 104 can detect reflections of the radar signals and waveforms (e.g., radar signals and waveforms reflected from objects in the volume of space). The radar system 104 also enables the smartphone 102 to sense and analyze reflections from an object 112 in the radar field 110. In the examples described with respect to FIG. 1, the described features and techniques are implemented in the smartphone 102, though the described features and techniques may be used with any of a variety of electronic devices (e.g., as described with reference to FIG. 2).

The object 112 may be any of a variety of objects that the radar system 104 can sense and analyze reflections from, such as wood, plastic, metal, fabric, or human body parts (e.g., a hand of a user of the smartphone 102). As shown in FIG. 1, the object 112 is a person or a user of the smartphone 102 (e.g., a person 112 or a user 112). Based on the analysis of the reflections, the radar system 104 can provide radar data that includes various types of information associated with the radar field 110 and the reflections from the object 112, as described below with reference to FIGS. 3-6 (e.g., the radar system 104 can transmit the radar data to other entities, such as the radar-based application 106).

It should be noted that the radar data may be continuously or periodically provided over time, based on the sensed and analyzed reflections from the object 112 in the radar field 110. A position of the object 112 can change over time (e.g., the object 112 may move within the radar field 110) and the radar data can thus vary over time corresponding to the changed positions, reflections, and analyses. Because the radar data may vary over time, the radar system 104 may provide radar data that includes one or more subsets of radar data that correspond to different periods of time. For example, the radar system 104 may provide a first subset of the radar data corresponding to a first time-period, a second subset of the radar data corresponding to a second time-period, and so forth.

The radar-based application 106 may be any of a variety of radar-based applications that can use the radar data to determine an orientation of the smartphone 102 with reference to the object 112 and provide orientation-based features or functions for the smartphone 102 (e.g., via the display 108). Additionally, the radar-based application 106 can use the radar data to determine a change in the orientation of the smartphone 102 with reference to the object and modify the orientation-based features or functions, based on the change in the orientation. In this way, the orientation of the object 112 within the radar field 110 can be used to provide input or instructions to interact with the smartphone 102.

The radar-based application 106 may include, or be in communication with, an orientation module 114, which can store, in an internal or external memory, information related to determining the orientation of the smartphone 102 with reference to the object 112 (based on the radar data) and information related to features and functions that correspond to particular orientations of the smartphone 102 with reference to the object 112. In some implementations, the radar-based application 106 may determine the orientation of the smartphone 102 with reference to the object 112 using information stored by the orientation module 114. In other implementations, the orientation module 114 itself may determine the orientation of the smartphone 102 with reference to the object 112. As shown in FIG. 1, the orientation module 114 is included in the radar-based application 106, but the orientation module 114 can be a separate entity that is part of, or separate from, the radar-based application 106 or the smartphone 102.

The radar-based application 106 may also include, or be in communication with, a 3D gesture module 116, which can store both information related to determining a 3D gesture based on the radar data (e.g., a 3D gesture by the object 112) and information related to actions that correspond to the 3D gestures. Thus, the radar-based application 106 can detect the 3D gesture by the object 112 and determine an action that corresponds to the 3D gesture.

In FIG. 1, the orientation-based function of the smartphone 102 with reference to the object 112 (in this case, the user 112) is a do-not-disturb (DND) mode (e.g., a mode in which reminders, notifications, or other device-initiated communications are silenced). Because the display 108 is still visible, non-intrusive content (e.g., a clock, a calendar, or a media player interface) may still be displayed. As shown in a detail view 100-1, the smartphone 102 has been placed in the DND mode by being positioned in a first orientation with reference to the user 112 (in this case, a landscape orientation). As described with reference to FIGS. 3-6, the radar system 104 can use the radar field 110 to sense and analyze reflections from objects in the radar field 110 in ways that enable high resolution and accuracy for recognizing device orientation. For example, because the smartphone 102 knows its own orientation with respect to the radar field, the radar data, as described above, can be used (e.g., by the radar-based application 106) to determine the first orientation of the smartphone 102 with reference to the user 112 and provide the DND mode.

In a detail view 100-2, the user 112 has rotated the smartphone 102 to a second orientation with reference to the user 112 (in this case, a portrait orientation). The rotation of the smartphone 102 is shown by an arrow 118. Again, the radar-based application 106 (or another application) can use the radar-data to determine a change from the landscape orientation to the portrait orientation, and in response to the change in orientation, exit the DND mode.

Note that it is not necessary for the user 112 to tilt or pick up the smartphone 102. In some implementations, for example, the rotation can be a flat rotation on a surface, a rotation within a plane that is substantially parallel to a viewing surface of the display 108, or a rotation about an axis that is substantially perpendicular to a plane containing the smartphone 102, and still be effective to cause the smartphone 102 to be in the portrait (second) orientation with reference to the user 112. Additionally, once the DND mode is exited, the radar-based application 106 can display any reminders, notifications, or other device-initiated communications that were silenced while the smartphone 102 was in the DND mode. In some implementations, the radar-based application 106 can determine that the rotation is effective to cause a modification of the orientation-based function if the rotation exceeds a threshold distance. The threshold distance may be any appropriate distance, such as 25, 45, 90, or 180 degrees, and may be predefined, user-selectable, or determined via a machine learning module that is included, or associated with, the radar system 104 or the radar-based application 106.

Consider three additional examples (not illustrated) that show how the described techniques may enable orientation-based functions. In the first example, the orientation-based function of the smartphone 102 is to present content on the display 108 in a user-facing orientation. In this way, the smartphone 102, via the radar-based application 106 or another application, can provide videos, photos, games, and other media that is automatically oriented toward the user 112, without the user 112 having to pick up the smartphone 102. The user 112 may change the orientation of the smartphone 102, and the smartphone 102, via the radar-based application 106 or another application, can determine that the orientation has changed to another orientation, and automatically maintain the user-facing orientation of the content while the smartphone 102 is in the other orientation with reference to the user 112.

For instance, the user 112 may change the orientation of the smartphone 102 by moving to another location or by rotating the smartphone 102. As noted, the user does not have to tilt or pick up the device. Rather, the change in the orientation of the smartphone 102 with reference to the user 112 can be a flat rotation on a surface, a rotation within a plane that is substantially parallel to a viewing surface of the display 108, or a rotation of the smartphone 102 about an axis that is substantially perpendicular to a plane containing the smartphone 102, and still be effective to cause the smartphone 102 to be in another orientation with reference to the user 112.

In the second example, there are two users 112. For example, a first user (Sam), who is the owner of the smartphone 102, and a second user (Chris), who is Sam's colleague. In this example, assume that Sam has a presentation that Chris wants to review. The orientation-based function of the smartphone 102 is to present content on the display 108 in an orientation facing Sam (e.g., a first-user-facing orientation, similar to the orientation-based function described in the prior example). Further assume that Chris and Sam are sitting on opposite sides of a table and Sam agrees to let Chris review the presentation. Sam may let Chris view the presentation by moving the smartphone 102 toward Chris. As described above, the radar data can be used (e.g., by the radar-based application 106) to determine a change in the orientation of the smartphone 102. In this case, the change is the smartphone 102 becoming farther from Sam and closer to Chris (e.g., the change in the orientation of the smartphone 102 with reference to Sam is a displacement of the smartphone 102 that causes the smartphone 102 to become farther from Sam and closer to Chris).

Upon determining the change in orientation, the smartphone 102, via the radar-based application 106 or another application, can automatically modify the orientation-based function to present the content on the display in an orientation facing Chris (e.g., a second-user-facing orientation). Thus, Sam can share the presentation with Chris without having to rotate or flip the smartphone 102. Rather, the displayed content can automatically re-orient toward Chris when Sam moves the device toward Chris. In this way, the smartphone 102 can provide videos, photos, games, and other media that are automatically oriented in an appropriate direction, without the user 112 having to manually adjust the orientation.

In the third example, the radar-based application 106, or another application, can use an attention cue to determine the orientation of the smartphone 102 with reference to the user 112. As described with reference to FIGS. 3-6, the radar system 104 can use the radar field 110 to sense and analyze reflections from objects in the radar field 110 in ways that enable high resolution and accuracy for recognizing a number and posture of people in the radar field 110. For example, by using angular resolution and digital beamforming, the radar system 104 can distinguish between leaning and standing. In this way, the smartphone 102 can detect the attention cue from the user 112. The attention cue is a body posture or position of the user 112, such as leaning forward or backward, or an orientation of a torso or head of the user 112 (e.g., toward or away from the smartphone 102). The attention cue can be used to determine whether the user 112 is paying attention while using the smartphone 102 to read a document, listen to music, look at photos, and so forth.

The attention cue can be determined using the radar data, as described above. For example, the radar data can be used to determine an attention cue by determining an angle of a torso or head of the user 112 with reference to a plane that is substantially parallel to a viewing surface of the display 108, such as a table on which the smartphone 102 is resting (e.g., whether the user 112 is leaning toward the smartphone 102) or an angular position of the torso or head of the user 112 (e.g., whether the user 112 is turned away from the smartphone 102), or a presence of the user 112 within a threshold distance of the smartphone 102.

In this example, the orientation-based function of the smartphone 102 is to present content on the display 108 in a content-display mode that is based on the attention cue (e.g., a first content-display mode). For instance, the content-display mode may be a media pause mode or a media play mode, a lock-screen mode, a sleep or wake mode, a full-screen or slideshow mode, or include a particular screen brightness level or volume level. The smartphone 102, using the radar-based application 106 or another application, can determine a change of the attention cue (e.g., a change in the orientation between the user 112 and the smartphone 102), such as a change from leaning forward to leaning backward or a turn of the user's 112 head from looking toward the display 108 to looking away.

In response to determining the change of the attention cue, the radar-based application 106 (or another application) can present content in another content-display mode (e.g., modify the orientation-based function of the smartphone 102 to present content in a second content-display mode). Like the first content-display mode, the other content-display mode can be a media pause mode or a media play mode, a lock-screen mode, a sleep or awake mode, a full-screen or slideshow mode, or include a particular screen brightness level or volume level. Continuing the example above, assume the user 112 is watching a video in a full-screen mode and then leans forward, toward the smartphone 102. In response, the radar-based application 106 can determine that the user 112 is going to interact with the video player and exit the full-screen mode.

In this way, the smartphone 102 can use attention cues to help determine the context in which the user 112 is employing the smartphone 102, and thereby provide an improved user experience. For example, if the smartphone 102 determines that the user 112 is not paying attention to a playing video, such as by determining that the user 112 has turned away from the display 108 (or has left the room), the smartphone 102 can pause the video and dim the screen brightness so that the user does not miss any content and to preserve battery power.

In some implementations, including implementations of the examples described above, the radar-based application 106 can determine that the rotation (e.g., rotation of the smartphone 102 or of the user's 112 torso or head) is effective to cause a modification of the orientation-based function if the rotation exceeds a threshold. The threshold may be any appropriate rotation, such as (25, 45, 90, or 180 degrees). Similarly, the displacement can be effective to cause a modification of the orientation-based function if the displacement causes the smartphone 102 to become at least a threshold distance farther from Sam and closer to Chris. The threshold distance may be any appropriate distance, such as six, twelve, or eighteen inches. Further, the angle (e.g., the angle at which the user 112 leans forward or backward) can be effective to cause the modification of the orientation-based function if the angle exceeds a threshold angle. The threshold angle may be any appropriate angle, such as 15, 25, 35, or 45 degrees. The threshold rotation, distance, or angle may be predefined, user-selectable, or determined via a machine learning module that is included, or associated with, the radar system 104 or the radar-based application 106.

Additionally, the radar-based application 106 can determine orientation changes that are effective to cause the modification of the orientation-based function if the orientation change is maintained for at least a threshold time. The threshold time may be any appropriate time (e.g., 0.5, 1.5, or 2.5 seconds), and may be predefined, user-selectable, or determined via a machine learning module that is included, or associated with, the radar system 104 or the radar-based application 106.

Figure 2:
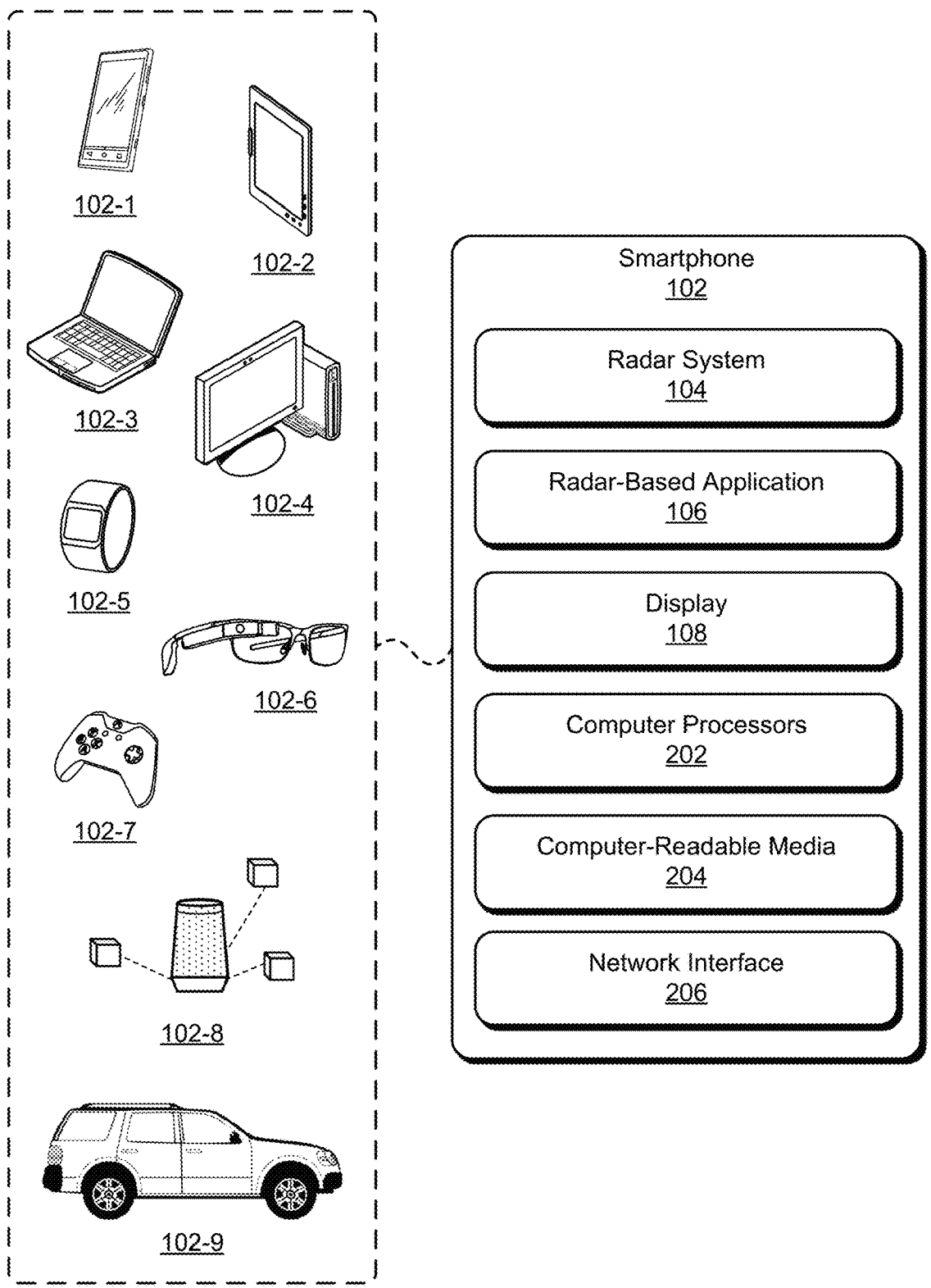
FIG. 2 illustrates an example implementation of the smartphone of FIG. 1 that includes a radar system and can implement the smartphone providing radar-based proxemic context.

In more detail, consider FIG. 2, which illustrates an example implementation 200 of the smartphone 102 (including the radar system 104, the radar-based application 106, and, optionally, the display 108) that can implement a smartphone providing radar-based proxemic context. The smartphone 102 of FIG. 2 is illustrated to include other non-limiting example devices that can implement a smartphone providing radar-based proxemic context, including a mobile phone 102-1, a tablet 102-2, a laptop 102-3, a desktop computer 102-4, a computing watch 102-5, computing spectacles 102-6, a gaming system 102-7, a home-automation and control system 102-8, and a vehicle 102-9. The other devices may include televisions, entertainment systems, audio systems, drones, track pads, drawing pads, netbooks, e-readers, home security systems, and other home appliances. Note that the devices that can implement the described techniques can be wearable, non-wearable but mobile, or relatively immobile (e.g., desktops and appliances).

Exemplary overall lateral dimensions of the smartphone 102 can be, for example, approximately eight centimeters by approximately fifteen centimeters. Exemplary footprints of the radar system 104 can be even more limited, such as approximately four millimeters by six millimeters with antennas included. Exemplary power consumption of the radar system 104 may be on the order of a few milliwatts (mW) to several mW (e.g., between approximately two mW and twenty mW). The requirement of such a limited footprint for the radar system 104, which is needed to accommodate the many other desirable features of the smartphone 102 in such a space-limited package (e.g., a camera, a fingerprint sensor, the display 108, and so forth) combined with power and processing limitations, can lead to compromises in the accuracy and efficacy of radar gesture detection, at least some of which can be overcome in view of the teachings herein.

The smartphone 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some of the functionalities described herein. The smartphone 102 may also include a network interface 206. The smartphone 102 can use the network interface 206 for communicating data over wired, wireless, or optical networks. By way of example and not limitation, the network interface 206 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 operates as a monostatic radar by transmitting and receiving its own radar signals. In some implementations, the radar system 104 may also cooperate with other radar systems 104 that are within an external environment to implement a bistatic radar, a multistatic radar, or a network radar. As noted, constraints or limitations of the smartphone 102 may impact a design of the radar system 104. The smartphone 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below with respect to FIG. 3. Note that in FIG. 2, the radar system 104 is illustrated as part of the smartphone 102. In other implementations, the radar system 104 may be separate or remote from the smartphone 102.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 25 illustrate some of many possible environments and devices capable of employing the described techniques. FIGS. 3-6 describe additional details and features of the radar system 104. In FIGS. 3-6, the radar system 104 is described in the context of the smartphone 102, but as noted above, the applicability of the features and advantages of the described systems and techniques are not necessarily so limited, and other embodiments involving other types of electronic devices may also be within the scope of the present teachings.

Figure 3:
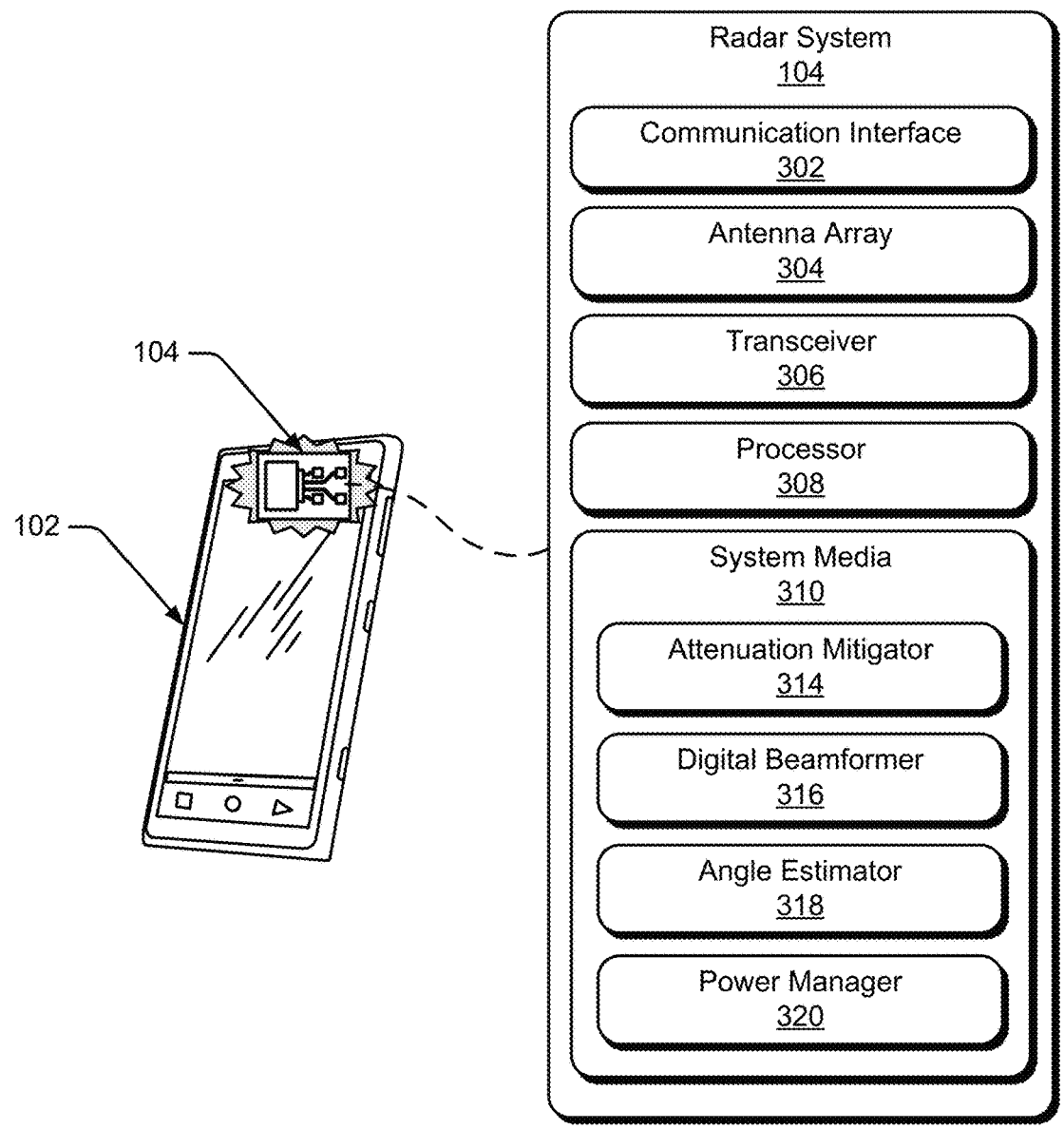
FIG. 3 illustrates an example implementation of the radar system of FIGS. 1 and 2.

FIG. 3 illustrates an example implementation 300 of the radar system 104 that can be used to enable a smartphone providing radar-based proxemic context. In the example 300, the radar system 104 includes at least one of each of the following components: a communication interface 302, an antenna array 304, a transceiver 306, a processor 308, and a system media 310 (e.g., one or more computer-readable storage media). The processor 308 can be implemented as a digital signal processor, a controller, an application processor, another processor (e.g., the computer processor 202 of the smartphone 102) or some combination thereof. The system media 310, which may be included within, or be separate from, the computer-readable media 204 of the smartphone 102, includes one or more of the following modules: an attenuation mitigator 314, a digital beamformer 316, an angle estimator 318, or a power manager 320. These modules can compensate for, or mitigate the effects of, integrating the radar system 104 within the smartphone 102, thereby enabling the radar system 104 to recognize small or complex gestures, distinguish between different orientations of the user, continuously monitor an external environment, or realize a target false alarm rate. With these features, the radar system 104 can be implemented within a variety of different devices, such as the devices illustrated in FIG. 2.

Using the communication interface 302, the radar system 104 can provide radar data to the radar-based application 106. The communication interface 302 may be a wireless or wired interface based on the radar system 104 being implemented separate from, or integrated within, the smartphone 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the radar-based application 106 for a smartphone providing radar-based proxemic context.

Figure 4:
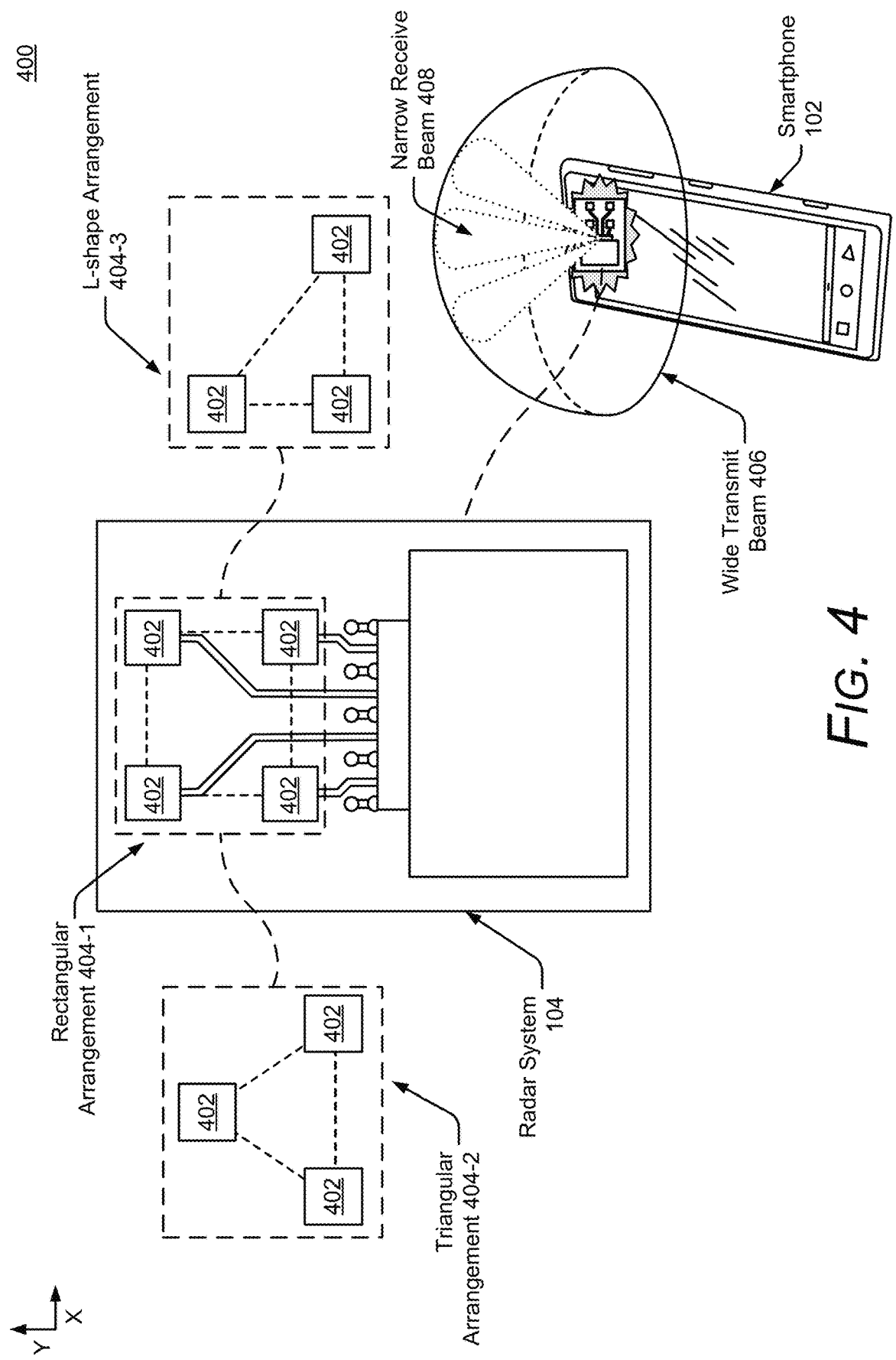
FIG. 4 illustrates example arrangements of receiving antenna elements for the radar system of FIG. 3.

The antenna array 304 includes at least one transmitting antenna element (not shown) and at least two receiving antenna elements (as shown in FIG. 4). In some cases, the antenna array 304 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 4.

FIG. 4 illustrates example arrangements 400 of receiving antenna elements 402. If the antenna array 304 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 304 includes at least three receiving antenna elements 402.

Due to a size or layout constraint of the smartphone 102, an element spacing between the receiving antenna elements 402 or a quantity of the receiving antenna elements 402 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 5 millimeters (mm) and an element spacing of 3.5 mm (e.g., the element spacing being 70% of the wavelength). Consequently, the conventional radar may be unable to detect targets that are beyond the 45-degree limits of the field of view. In contrast, the radar system 104 includes the digital beamformer 316 and the angle estimator 318, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e.g., azimuth and/or elevation). Accordingly, the radar system 104 can realize low false-alarm rates for a variety of different antenna array designs, including element spacings that are less than, greater than, or equal to half a center wavelength of the radar signal.

Using the antenna array 304, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 104 to illuminate a large volume of space. To achieve target angular accuracies and angular resolutions, however, the receiving antenna elements 402 and the digital beamformer 316 can be used to generate thousands of narrow and steered beams (e.g., 2000 beams, 4000 beams, or 6000 beams), such as the narrow receive beam 408. In this way, the radar system 104 can efficiently monitor the external environment and accurately determine arrival angles of reflections within the external environment.

Returning to FIG. 3, the transceiver 306 includes circuitry and logic for transmitting and receiving radar signals via the antenna array 304. Components of the transceiver 306 can include amplifiers, mixers, switches, analog-to-digital converters, filters, and so forth for conditioning the radar signals. The transceiver 306 can also include logic to perform in-phase/quadrature (I/Q) operations, such as modulation or demodulation. The transceiver 306 can be configured for continuous wave radar operations or pulsed radar operations. A variety of modulations can be used to produce the radar signals, including linear frequency modulations, triangular frequency modulations, stepped frequency modulations, or phase modulations.

The transceiver 306 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 318 to resolve angular ambiguities. The attenuation mitigator 314 or the angle estimator 318 may cause the transceiver 306 to utilize one or more frequency sub-spectra to improve performance of the radar system 104, as further described with respect to FIGS. 5 and 6.

The power manager 320 enables the radar system 104 to conserve power internally or externally within the smartphone 102. Internally, for example, the power manager 320 can cause the radar system 104 to collect data using a predefined power mode or a specific duty cycle. Instead of operating at either a low-power mode or a high-power mode, the power manager 320 dynamically switches between different power modes such that response delay and power consumption are managed together based on the activity within the environment. In general, the power manager 320 determines when and how power can be conserved, and incrementally adjusts power consumption to enable the radar system 104 to operate within power limitations of the smartphone 102. In some cases, the power manager 320 may monitor an amount of available power remaining and adjust operations of the radar system 104 accordingly. For example, if the remaining amount of power is low, the power manager 320 may continue operating at the low-power mode instead of switching to the higher power mode.

The low-power mode, for example, may use a low duty cycle on the order of a few hertz (e.g., approximately 1 Hz or less than 5 Hz), which reduces power consumption to a few milliwatts (mW) (e.g., between approximately 2 mW and 5 mW). The high-power mode, on the other hand, may use a high duty cycle on the order of tens of hertz (Hz) (e.g., approximately 20 Hz or greater than 10 Hz), which causes the radar system 104 to consume power on the order of several milliwatts (e.g., between approximately 8 mW and 20 mW). While the low-power mode can be used to monitor the external environment or detect an approaching user, the power manager 320 may switch to the high-power mode if the radar system 104 determines the user is starting to perform a gesture. Different triggers may cause the power manager 320 to switch between the different power modes. Example triggers include motion or the lack of motion, appearance or disappearance of the user (e.g., the presence or absence of the user), the user moving into or out of a designated region (e.g., a region defined by range, azimuth, or elevation), a distance of the user from the smartphone 102, such as the awareness distance 706 described above, a change in velocity of a motion associated with the user, or a change in reflected signal strength (e.g., due to changes in radar cross section). In general, the triggers that indicate a lower probability of the user interacting with the smartphone 102 or a preference to collect data using a longer response delay may cause a lower-power mode to be activated to conserve power.

The power manager 320 can also conserve power by turning off one or more components within the transceiver 306 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (µs), milliseconds (ms), or seconds (s). For example, an inactive time period may occur when no user is present or when a user is present, but determined not to be attentive to the smartphone 102 (e.g., based on one or more attention cues as described in this specification). Additionally, the power manager 320 can control the use of different hardware components within the radar system 104 to conserve power. If the processor 308 comprises a low-power processor and a high-power processor (e.g., processors with different amounts of memory and computational capability), for example, the power manager 320 can switch between utilizing the low-power processor for low-level analysis (e.g., detecting motion, determining a location of a user, or monitoring the environment) and the high-power processor for situations in which high-fidelity or accurate radar data is requested by the radar-based application 106 (e.g., for gesture recognition or user orientation).

In addition to the internal power-saving techniques described above, the power manager 320 can also conserve power within the smartphone 102 by activating or deactivating other external components or sensors that are within the smartphone 102. These external components may include speakers, a camera sensor, a global positioning system, a wireless communication transceiver, a display, a gyroscope, or an accelerometer. Because the radar system 104 can monitor the environment using a small amount of power, the power manager 320 can appropriately turn these external components on or off based on where the user is located or what the user is doing. In this way, the smartphone 102 can seamlessly respond to the user and conserve power without the use of automatic shut-off timers or the user physically touching or verbally controlling the smartphone 102.

Figure 5:
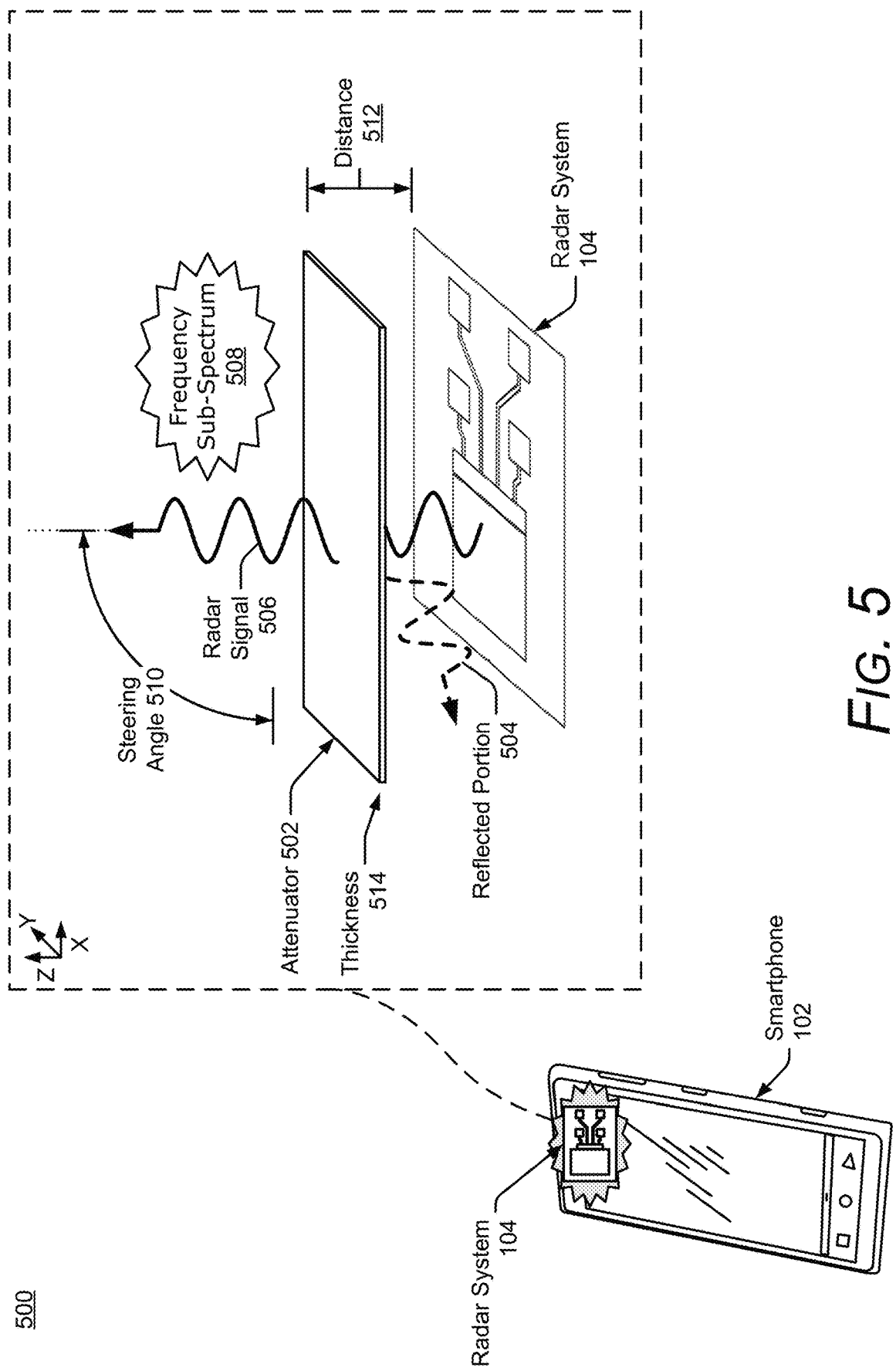
FIG. 5 illustrates additional details of an example implementation of the radar system of FIGS. 1 and 2.

FIG. 5 illustrates additional details of an example implementation 500 of the radar system 104 within the smartphone 102. In the example 500, the antenna array 304 is positioned underneath an exterior housing of the smartphone 102, such as a glass cover or an external case. Depending on its material properties, the exterior housing may act as an attenuator 502, which attenuates or distorts radar signals that are transmitted and received by the radar system 104. The attenuator 502 may include different types of glass or plastics, some of which may be found within display screens, exterior housings, or other components of the smartphone 102 and have a dielectric constant (e.g., relative permittivity) between approximately four and ten. Accordingly, the attenuator 502 is opaque or semi-transparent to a radar signal 506 and may cause a portion of a transmitted or received radar signal 506 to be reflected (as shown by a reflected portion 504). For conventional radars, the attenuator 502 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 506 (e.g., a frequency sub-spectrum 508 or a steering angle 510) or attenuation-dependent characteristics of the attenuator 502 (e.g., a distance 512 between the attenuator 502 and the radar system 104 or a thickness 514 of the attenuator 502) are adjusted to mitigate the effects of the attenuator 502. Some of these characteristics can be set during manufacturing or adjusted by the attenuation mitigator 314 during operation of the radar system 104. The attenuation mitigator 314, for example, can cause the transceiver 306 to transmit the radar signal 506 using the selected frequency sub-spectrum 508 or the steering angle 510, cause a platform to move the radar system 104 closer or farther from the attenuator 502 to change the distance 512, or prompt the user to apply another attenuator to increase the thickness 514 of the attenuator 502.

Appropriate adjustments can be made by the attenuation mitigator 314 based on pre-determined characteristics of the attenuator 502 (e.g., characteristics stored in the computer-readable media 204 of the smartphone 102 or within the system media 310) or by processing returns of the radar signal 506 to measure one or more characteristics of the attenuator 502. Even if some of the attenuation-dependent characteristics are fixed or constrained, the attenuation mitigator 314 can take these limitations into account to balance each parameter and achieve a target radar performance. As a result, the attenuation mitigator 314 enables the radar system 104 to realize enhanced accuracy and larger effective ranges for detecting and tracking the user that is located on an opposite side of the attenuator 502. These techniques provide alternatives to increasing transmit power, which increases power consumption of the radar system 104, or changing material properties of the attenuator 502, which can be difficult and expensive once a device is in production.

Figure 6:
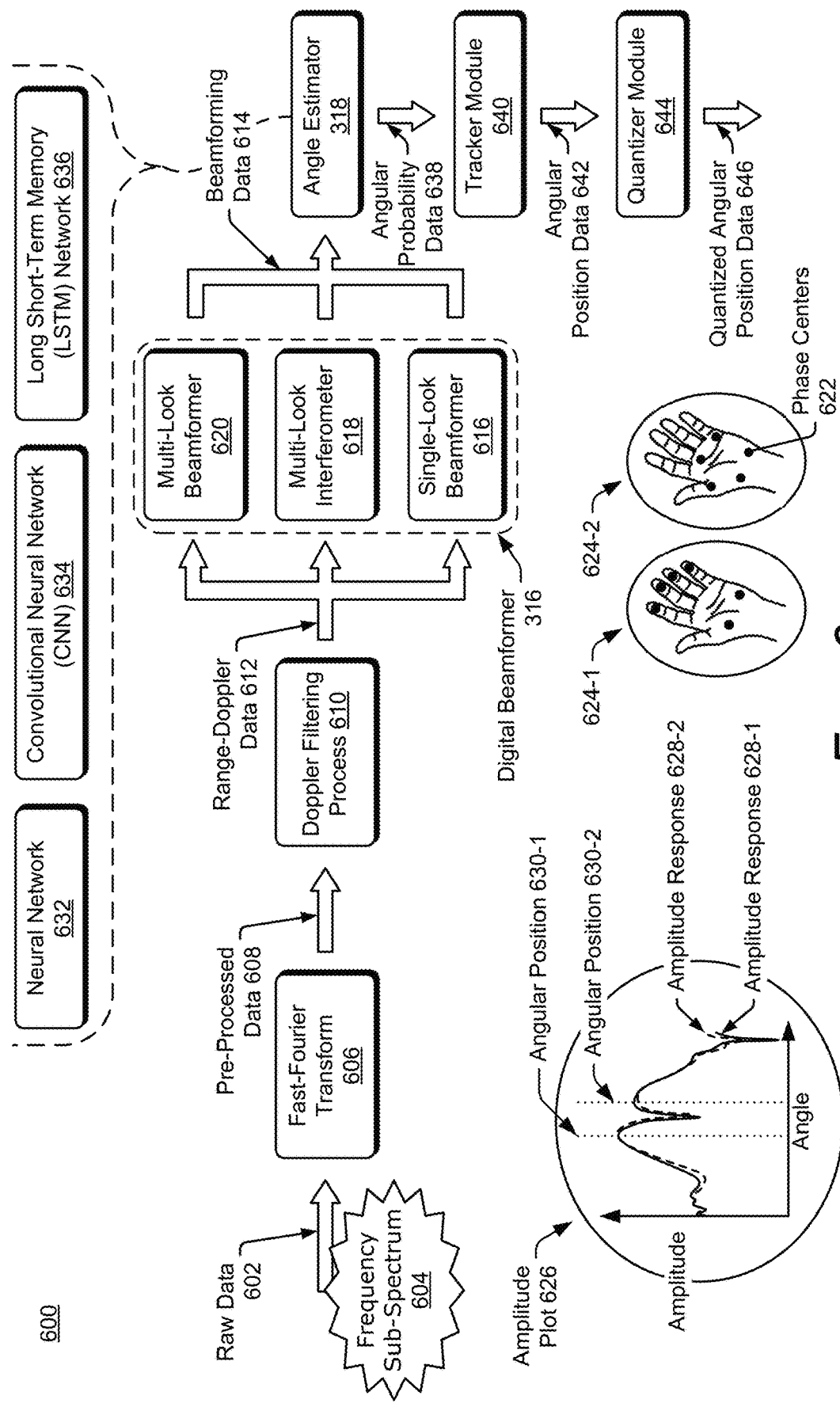
FIG. 6 illustrates an example scheme that can be implemented by the radar system of FIGS. 1 and 2.

FIG. 6 illustrates an example scheme 600 implemented by the radar system 104. Portions of the scheme 600 may be performed by the processor 308, the computer processors 202, or other hardware circuitry. The scheme 600 can be customized to support different types of smartphones 102 and radar-based applications 106, and also enables the radar system 104 to achieve target angular accuracies despite design constraints.

The transceiver 306 produces raw data 602 based on individual responses of the receiving antenna elements 402 to a received radar signal. The received radar signal may be associated with one or more frequency sub-spectra 604 that were selected by the angle estimator 318 to facilitate angular ambiguity resolution. The frequency sub-spectra 604, for example, may be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 602 contains digital information (e.g., in-phase and quadrature data) for a period of time, different wavenumbers, and multiple channels respectively associated with the receiving antenna elements 402. A Fast-Fourier Transform (FFT) 606 is performed on the raw data 602 to generate pre-processed data 608. The pre-processed data 608 includes digital information across the period of time, for different ranges (e.g., range bins), and for the multiple channels. A Doppler filtering process 610 is performed on the pre-processed data 608 to generate range-Doppler data 612. The Doppler filtering process 610 may comprise another FFT that generates amplitude and phase information for multiple range bins, multiple Doppler frequencies, and for the multiple channels. The digital beamformer 316 produces beamforming data 614 based on the range-Doppler data 612. The beamforming data 614 contains digital information for a set of azimuths and/or elevations, which represents the field of view for which different steering angles or beams are formed by the digital beamformer 316. Although not depicted, the digital beamformer 316 may alternatively generate the beamforming data 614 based on the pre-processed data 608 and the Doppler filtering process 610 may generate the range-Doppler data 612 based on the beamforming data 614. To reduce a quantity of computations, the digital beamformer 316 may process a portion of the range-Doppler data 612 or the pre-processed data 608 based on a range, time, or Doppler frequency interval of interest.

The digital beamformer 316 can be implemented using a single-look beamformer 616, a multi-look interferometer 618, or a multi-look beamformer 620. In general, the single-look beamformer 616 can be used for deterministic objects (e.g., point-source targets having a single phase center). For non-deterministic targets (e.g., targets having multiple phase centers), the multi-look interferometer 618 or the multi-look beamformer 620 are used to improve accuracies relative to the single-look beamformer 616. Humans are an example of a non-deterministic target and have multiple phase centers 622 that can change based on different aspect angles, as shown at 624-1 and 624-2 (e.g., as a result of changes in a user's orientation with reference to the smartphone 102, such as turning toward or away, leaning toward, or moving closer or farther). Variations in the constructive or destructive interference generated by the multiple phase centers 622 can make it challenging for conventional radars to accurately determine angular positions. The multi-look interferometer 618 or the multi-look beamformer 620, however, perform coherent averaging to increase an accuracy of the beamforming data 614. The multi-look interferometer 618 coherently averages two channels to generate phase information that can be used to accurately determine the angular information. The multi-look beamformer 620, on the other hand, can coherently average two or more channels using linear or non-linear beamformers, such as Fourier, Capon, multiple signal classification (MUSIC), or minimum variance distortion less response (MVDR). The increased accuracies provided via the multi-look beamformer 620 or the multi-look interferometer 618 enable the radar system 104 to recognize small gestures or distinguish between multiple portions of the user.

The angle estimator 318 analyzes the beamforming data 614 to estimate one or more angular positions. The angle estimator 318 may utilize signal processing techniques, pattern matching techniques, or machine learning. The angle estimator 318 also resolves angular ambiguities that may result from a design of the radar system 104 or the field of view the radar system 104 monitors. An example angular ambiguity is shown within an amplitude plot 626 (e.g., amplitude response).

The amplitude plot 626 depicts amplitude differences that can occur for different angular positions of the target and for different steering angles 510. A first amplitude response 628-1 (illustrated with a solid line) is shown for a target positioned at a first angular position 630-1. Likewise, a second amplitude response 628-2 (illustrated with a dotted-line) is shown for the target positioned at a second angular position 630-2. In this example, the differences are considered across angles between −180 degrees and 180 degrees.

As shown in the amplitude plot 626, an ambiguous zone exists for the two angular positions 630-1 and 630-2. The first amplitude response 628-1 has a highest peak at the first angular position 630-1 and a lesser peak at the second angular position 630-2. While the highest peak corresponds to the actual position of the target, the lesser peak causes the first angular position 630-1 to be ambiguous because it is within some threshold for which conventional radars may be unable to confidently determine whether the target is at the first angular position 630-1 or the second angular position 630-2. In contrast, the second amplitude response 628-2 has a lesser peak at the second angular position 630-2 and a higher peak at the first angular position 630-1. In this case, the lesser peak corresponds to target's location.

While conventional radars may be limited to using a highest peak amplitude to determine the angular positions, the angle estimator 318 instead analyzes subtle differences in shapes of the amplitude responses 628-1 and 628-2. Characteristics of the shapes can include, for example, roll-offs, peak or null widths, an angular location of the peaks or nulls, a height or depth of the peaks and nulls, shapes of sidelobes, symmetry within the amplitude response 628-1 or 628-2, or the lack of symmetry within the amplitude response 628-1 or 628-2. Similar shape characteristics can be analyzed in a phase response, which can provide additional information for resolving the angular ambiguity. The angle estimator 318 therefore maps the unique angular signature or pattern to an angular position.

The angle estimator 318 can include a suite of algorithms or tools that can be selected according to the type of smartphone 102 (e.g., computational capability or power constraints) or a target angular resolution for the radar-based application 106. In some implementations, the angle estimator 318 can include a neural network 632, a convolutional neural network (CNN) 634, or a long short-term memory (LSTM) network 636. The neural network 632 can have various depths or quantities of hidden layers (e.g., three hidden layers, five hidden layers, or ten hidden layers) and can also include different quantities of connections (e.g., the neural network 632 can comprise a fully-connected neural network or a partially-connected neural network). In some cases, the CNN 634 can be used to increase computational speed of the angle estimator 318. The LSTM network 636 can be used to enable the angle estimator 318 to track the target. Using machine learning techniques, the angle estimator 318 employs non-linear functions to analyze the shape of the amplitude response 628-1 or 628-2 and generate angular probability data 638, which indicates a likelihood that the user or a portion of the user is within an angular bin. The angle estimator 318 may provide the angular probability data 638 for a few angular bins, such as two angular bins to provide probabilities of a target being to the left or right of the smartphone 102, or for thousands of angular bins (e.g., to provide the angular probability data 638 for a continuous angular measurement).

Based on the angular probability data 638, a tracker module 640 produces angular position data 642, which identifies an angular location of the target. The tracker module 640 may determine the angular location of the target based on the angular bin that has a highest probability in the angular probability data 638 or based on prediction information (e.g., previously-measured angular position information). The tracker module 640 may also keep track of one or more moving targets to enable the radar system 104 to confidently distinguish or identify the targets. Other data can also be used to determine the angular position, including range, Doppler, velocity, or acceleration. In some cases, the tracker module 640 can include an alpha-beta tracker, a Kalman filter, a multiple hypothesis tracker (MHT), and so forth.

A quantizer module 644 obtains the angular position data 642 and quantizes the data to produce quantized angular position data 646. The quantization can be performed based on a target angular resolution for the radar-based application 106. In some situations, fewer quantization levels can be used such that the quantized angular position data 646 indicates whether the target is to the right or to the left of the smartphone 102 or identifies a 90-degree quadrant the target is located within. This may be sufficient for some radar-based applications 106, such as user proximity detection. In other situations, a larger number of quantization levels can be used such that the quantized angular position data 646 indicates an angular position of the target within an accuracy of a fraction of a degree, one degree, five degrees, and so forth. This resolution can be used for higher-resolution radar-based applications 106, such as gesture recognition. In some implementations, the digital beamformer 316, the angle estimator 318, the tracker module 640, and the quantizer module 644 are together implemented in a single machine learning module.

These and other capabilities and configurations, as well as ways in which entities of FIGS. 1-6 act and interact, are set forth below. The described entities may be further divided, combined, used along with other sensors or components, and so on. In this way, different implementations of the smartphone 102, with different configurations of the radar system 104 and non-radar sensors, can be used to implement a smartphone providing radar-based proxemic context. The example operating environment 100 of FIG. 1 and the detailed illustrations of FIGS. 2-6 illustrate but some of many possible environments and devices capable of employing the described techniques.

Example Systems

Figure 7:
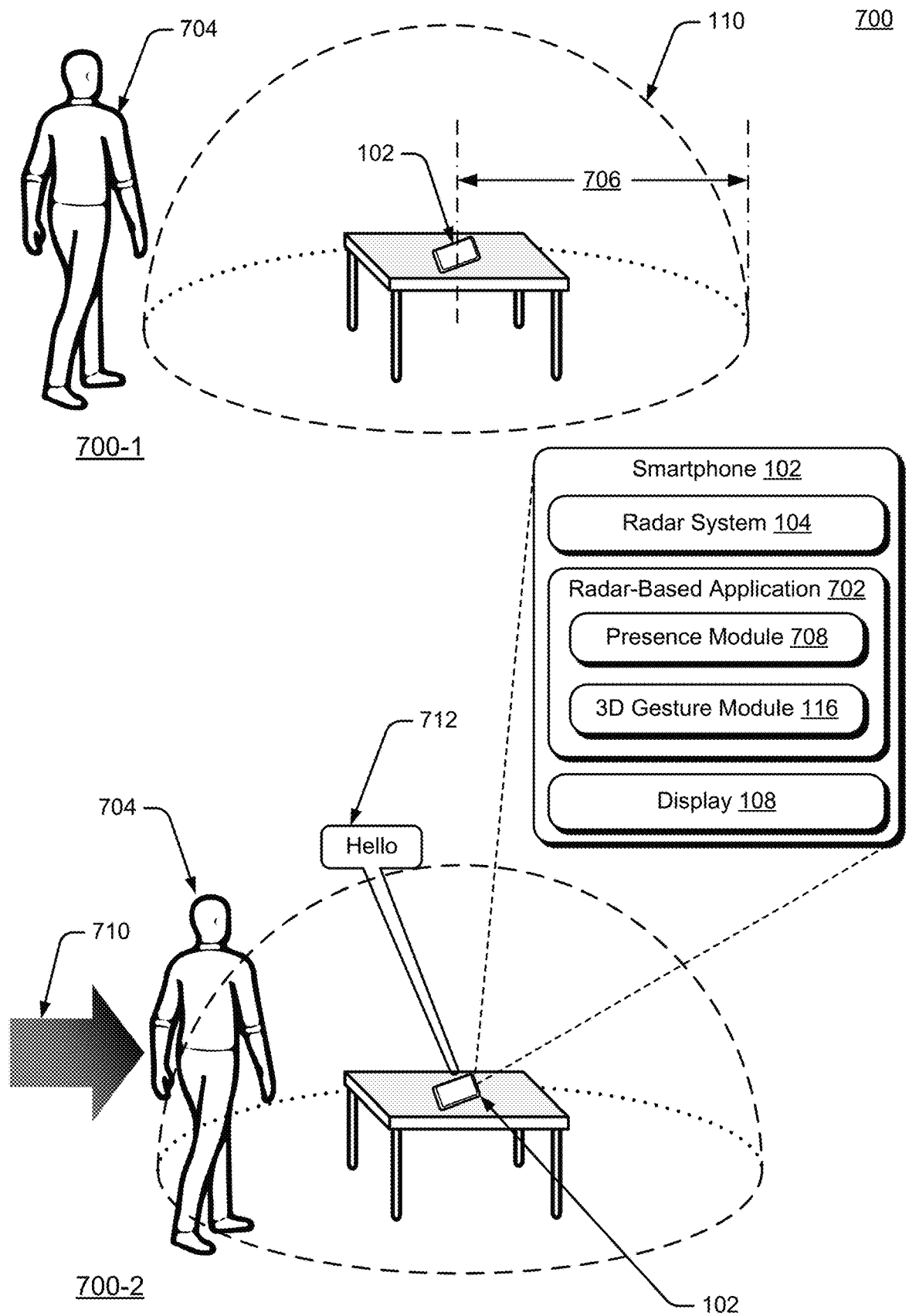
FIG. 7 illustrates another example environment in which techniques enabling a smartphone providing radar-based proxemic context can be implemented.

As noted, the techniques and systems described herein can also enable the smartphone 102 to provide functionality based on a user's presence and to receive 3D gestures from the user to interact with the device. FIG. 7 illustrates another example environment 700 in which techniques enabling a smartphone providing radar-based proxemic context can be implemented. The example operating environment 700 includes the smartphone 102, which includes, or is associated with, the radar system 104, and a radar-based application 702. In some implementations, the smartphone 102 may include a display, such as the display 108. While the example operating environment 700 is illustrated in the context of the smartphone 102, other electronic devices, as described above with reference to FIGS. 1 and 2, may also be used to implement the features and techniques described with reference to FIGS. 7-20. In the example environment 700, the radar system 104 provides the radar field 110 as described above with reference to FIGS. 1-6. The radar system 104 also enables the smartphone 102 to sense and analyze reflections from an object 704 in the radar field 110. In the examples described with respect to FIGS. 7-20, the smartphone 102 is the smartphone 102, though the described features and techniques may be used with any of a variety of electronic devices (e.g., as described with reference to FIG. 2).

As shown in FIG. 7, the object 704 is a person or a user of the smartphone 102 (person 704 or user 704), but the object 704 may be any of a variety of objects that the radar system 104 can sense and analyze reflections from, such as wood, plastic, metal, fabric, or organic material (e.g., the user 704). Based on the analysis of the reflections, the radar system 104 can provide radar data as described above with reference to FIGS. 1-6 and may pass the radar data to other entities, such as the radar-based application 702.

The radar-based application 702 may be any of a variety of radar-based applications that can use the radar data to determine a presence of the user 704 within an awareness distance 706 of the smartphone 102. The awareness distance may be any appropriate distance, such as three, seven, ten, or fourteen feet (or one, two, three, or four meters), and may coincide with the extent of the radar field 110, as shown in a detail view 700-1 of FIG. 7. In other cases, the awareness distance 706 may be less than a maximum extent of the radar field 110. The awareness distance 706 may be predefined, user-selectable, or determined via a machine learning module that is included, or associated with, the radar system 104 or the radar-based application 702.

Based on the presence of the user 704 within the awareness distance 706 of the smartphone 102, the radar-based application 702 can provide presence-based features or functions for the smartphone 102 (e.g., via the display 108). For example, as shown in a detail view 700-2 of FIG. 7, the user 704 has moved toward the smartphone 102 (shown by an arrow 710) and is within the awareness distance 706. In response, the smartphone 102 provides a presence-based function, such as an electronic assistant that includes a voice interface, shown as a text bubble ("Hello") 712. Additionally, the radar-based application 702 can use the radar data to determine that the user 704 is outside the awareness distance 706 and modify, or cease to provide, the presence-based features or functions, based on the change of the presence of the user 704 within the awareness distance 706. In this way, the presence of the user 704 within the awareness distance 706 can be used to provide input or instructions to interact with the smartphone 102.

The radar-based application 702 may include, or be in communication with, a presence module 708, which can store, in an internal or external memory, both information related to determining the presence of the user 704 within the awareness distance 706 (based on the radar data) and information related to features and functions that are based on the presence of the user 704 within the awareness distance 706. In some implementations, the radar-based application 702 may determine the presence or absence of the user 704, within the awareness distance 706, using information stored by the presence module 708. In other implementations, the presence module 708 itself may determine the presence or absence of the user 704, within the awareness distance 706. As shown in FIG. 7, the presence module 708 is included in the radar-based application 702, but the presence module 708 can be a separate entity that is part of, or separate from, the radar-based application 702 or the smartphone 102. In some implementations of either of the examples 100 or 700, the presence module 708 and the orientation module 114 (of FIG. 1) may be a single module that can perform the operations described with reference to both the presence module 708 and the orientation module 114, or combined with either of the radar-based applications 106 or 702.

The radar-based application 106 may also include, or be in communication with, a 3D gesture module (e.g., the 3D gesture module 116), which can store both information related to determining a 3D gesture based on the radar data (e.g., a 3D gesture by the user 704) and information related to actions that correspond to the 3D gestures. Thus, the radar-based application 702 can detect the 3D gesture by the user 704 and determine an action that corresponds to the 3D gesture. A 3D gesture can be any of a variety of gestures, including a scrolling gesture made by moving a hand above the smartphone 102 along a horizontal dimension (e.g., from a left side of the smartphone 102 to a right side of the smartphone 102), a waving gesture made by the user's arm rotating about an elbow, a pushing gesture made by moving the user's hand above the smartphone 102 along a vertical dimension (e.g., from a bottom side of the smartphone 102 to a top side of the smartphone 102). Other types of 3D gestures or motions may also be made, such as a reaching gesture made by moving the user's hand towards the smartphone 102, a knob-turning gesture made by curling fingers of the user's hand to grip an imaginary door knob and rotating in a clockwise or counter-clockwise fashion to mimic an action of turning the imaginary door knob, and a spindle-twisting gesture made by rubbing a thumb and at least one other finger together. Each of these example gesture types may be detected by the radar system 104. Upon detecting each of these gestures, the smartphone 102 may perform an action, such as display new content, move a cursor, activate one or more sensors, open an application, control a game, pin content to a screen, silence an alarm, control a user interface, or manipulate an AR element. In this way, the radar system 104 provides touch-free control of the smartphone 102.

As described with reference to the detail view 700-2, the presence-based function may be to provide an electronic assistant or a voice interface feature when the user 704 is within the awareness distance 706. In other implementations, the presence-based function may be another function, as described with reference to FIGS. 8-12.

Figure 8:
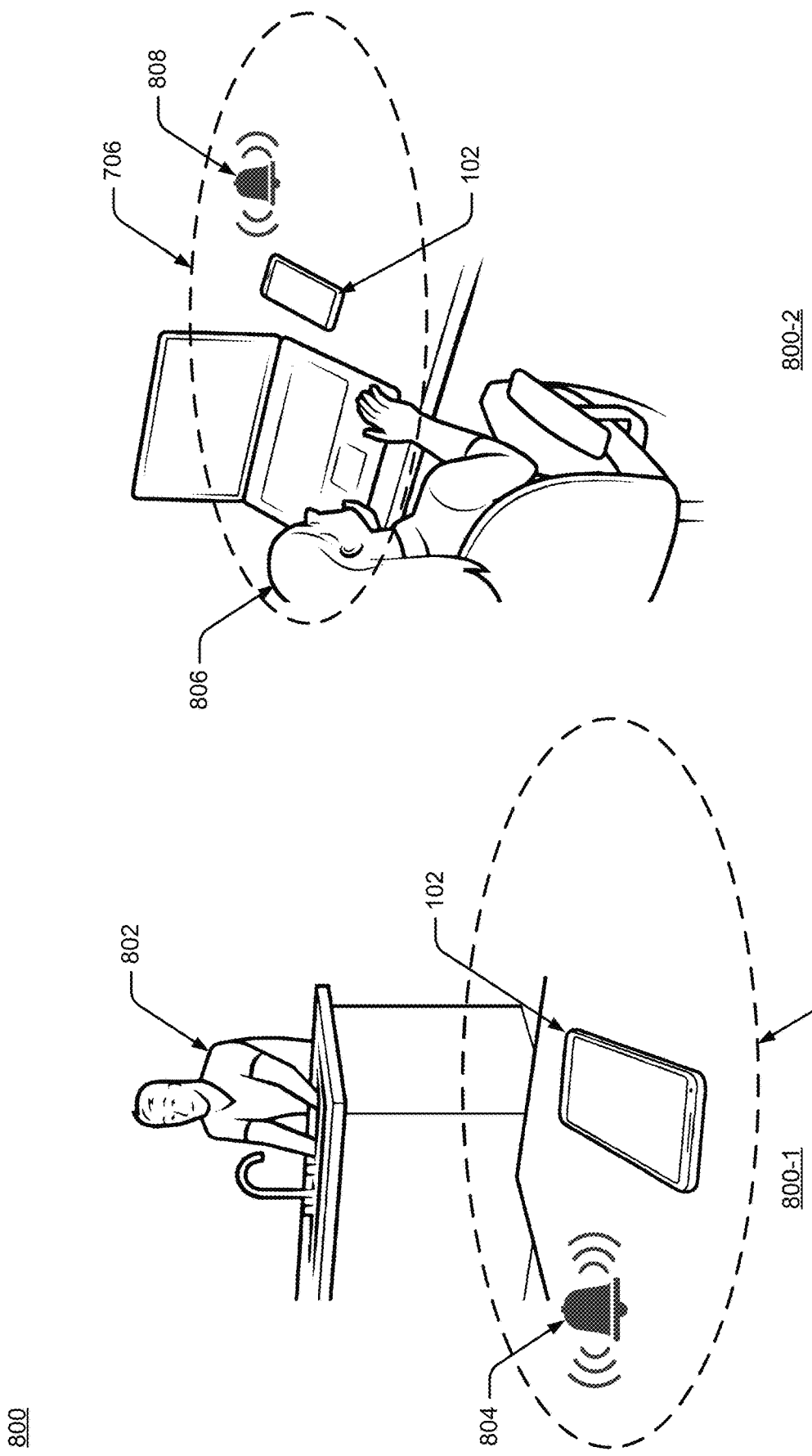

FIG. 8 illustrates an example 800 in which the presence-based function is an adjustment of a volume of a ringer, alert, or notification. In a detail view 800-1, a user 802 is relatively far from the smartphone 102 and is outside of the awareness distance 706 (shown by a dashed line ellipse 706), and the ringer volume is at one hundred percent of a default level set by the user 802, as shown by the ringer icon 804. Conversely, in a detail view 800-2, a user 806 is relatively near the smartphone 102 and is within the awareness distance 706 (again, shown by the dashed line ellipse 706), and the volume is reduced, as shown by the smaller ringer icon 808. The volume may be reduced by any appropriate amount (e.g., 25, 50, or 75 percent), and the reduction may be based on any of a variety of factors, such as by a distance between the user 804 and the smartphone 102 or by a preset or user-selected amount.

Figure 9:
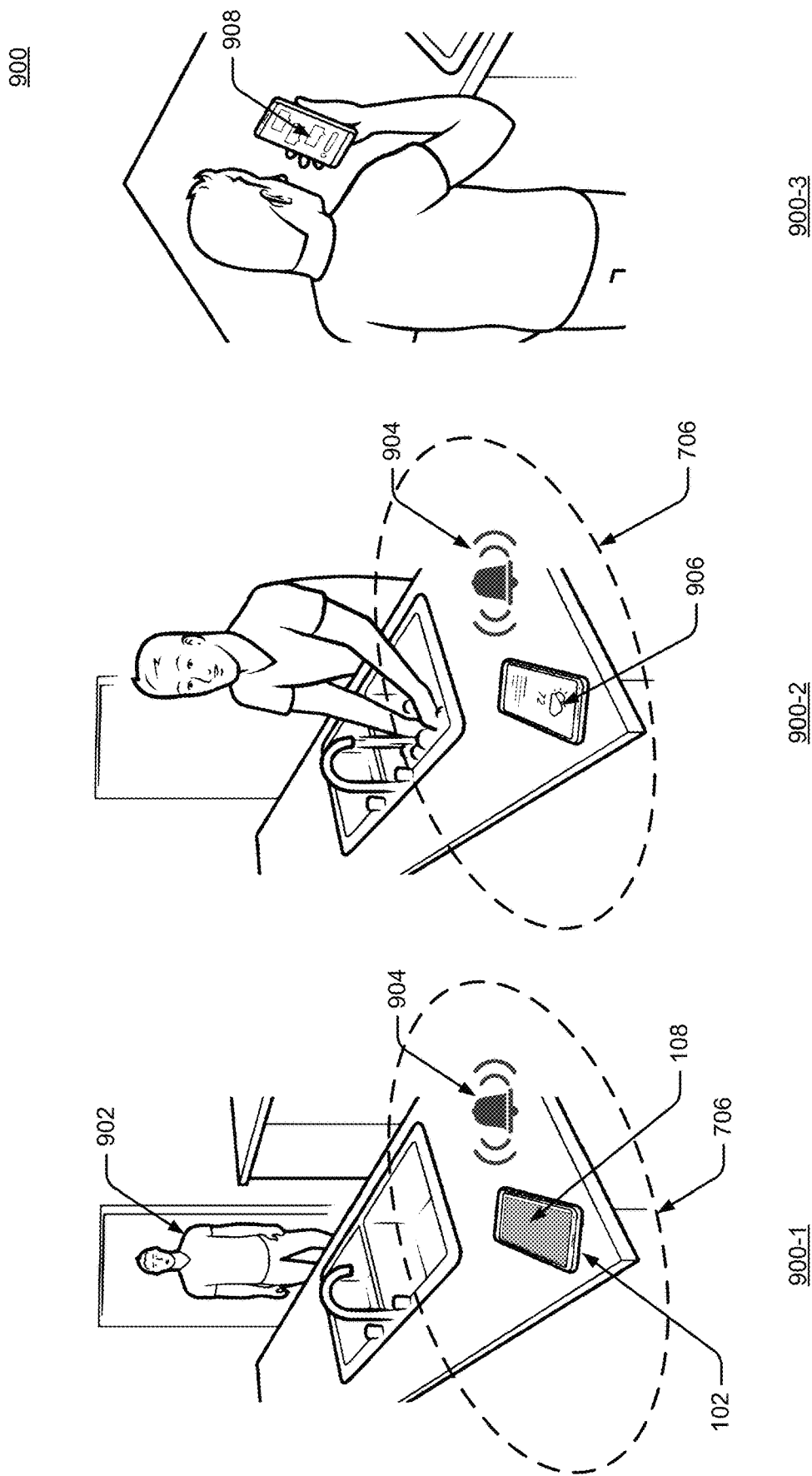

FIG. 9 illustrates an example 900 in which the presence-based function is an adjustment of a communication mode used by an electronic assistant included with the smartphone 102. The electronic assistant can communicate with users in various modes, providing text, audio, video, and so forth (e.g., on the display 108). In a detail view 900-1, a user 902 is relatively far from the smartphone 102 and is outside of the awareness distance 706 (shown by a dashed line ellipse 706), and the electronic assistant interacts in a voice mode, without turning on the display 108 (as shown by the ringer icon 904 and the darkened display 108 of the smartphone 102). Next, a detail view 900-2 shows the user 902 relatively near the smartphone 102 and within the awareness distance 706 (again, shown by the dashed line ellipse 706), and the electronic assistant complements the audio communication mode of the detail view 900-1 (the ringer icon 904) with glanceable display information 906 (e.g., information that can be read or understood with a glance, such as large text, symbols, or animations), as shown on the display 108. In this way, the described techniques can reduce power consumption of the smartphone 102 by limiting the use of the display 108 to a level appropriate to the presence of the user 902.

In some implementations, the adjustment of the communication mode may also include an adjustment of content presented on the display 108. For example, in a detail view 900-3, the user 902 picks up the smartphone 102. As noted, the radar-based application 702 may be able to determine 3D gestures and corresponding actions (e.g., using the 3D gesture module 116). Thus, when the user 902 reaches toward the smartphone 102, the radar-based application 702 can determine that the reach is the 3D gesture and that the corresponding action is for the electronic assistant to enable the user 902 to make text input and to provide richer visual information 908 (e.g., more and smaller text, embedded links, and video), as shown on the display 108.

Figure 10:
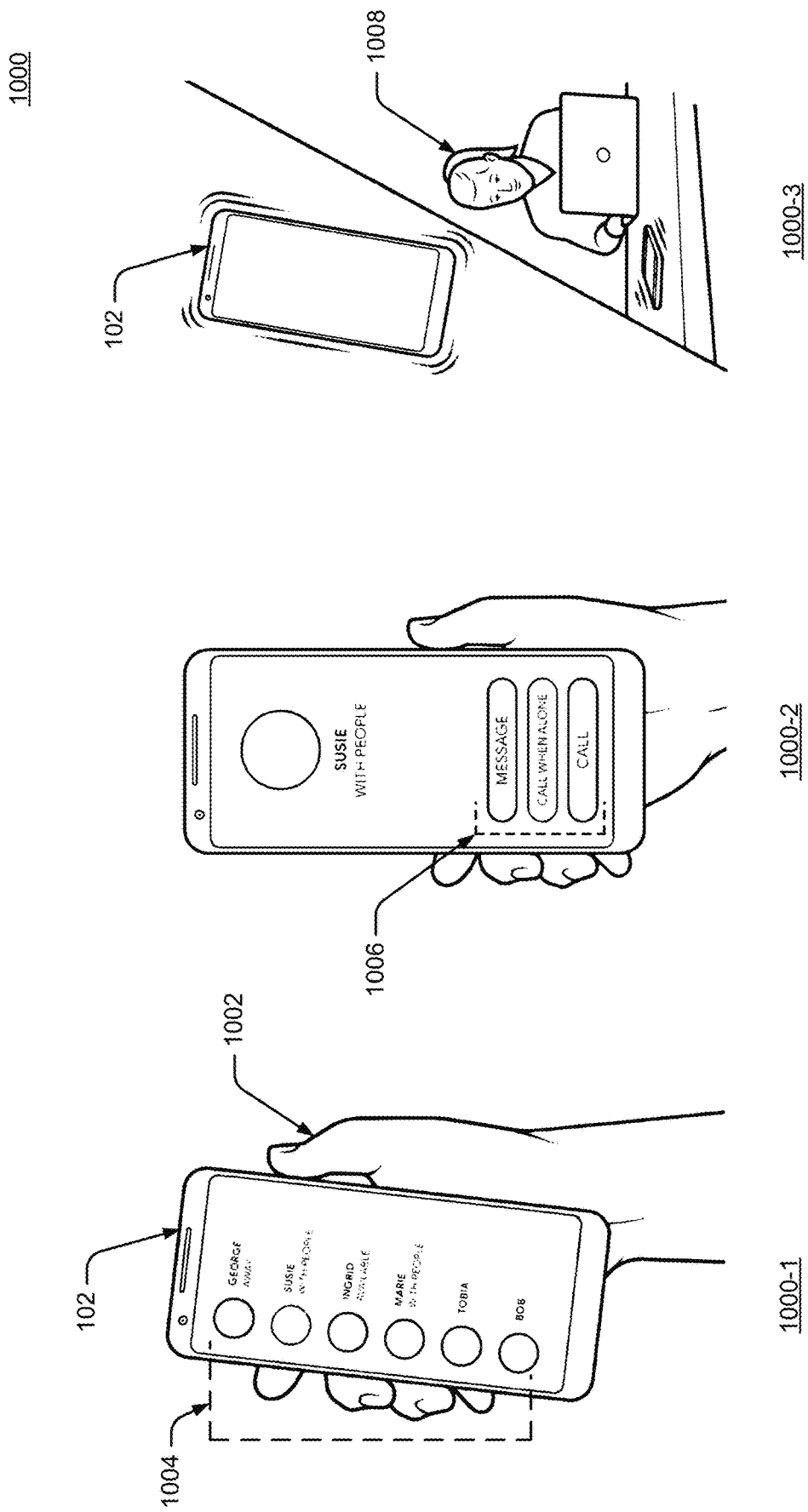

FIG. 10 illustrates an example 1000 in which the presence-based function is providing a notification of the presence of the object within the awareness distance. As described above, the smartphone 102 (e.g., via the radar system 104) can detect whether a user is within the awareness distance of the smartphone 102 and whether the user is alone or with other people. Using this information, the smartphone 102 (e.g., via the radar-based application 702) can provide a notification of the status of the user with respect to the smartphone 102 (e.g., a "proxemic context" of the user, such as whether the user is available (alone), with people, away, and so forth). The notification can be provided to one or more contacts stored on, or accessible by, the smartphone 102 and can be provided in any of a variety of ways, such as by a text message or a status indicator that is displayed when another party looks at the user's contact information.

For example, in a detail view 1000-1, a user 1002, whose phone includes the presence-based feature, reviews a contact list 1004 (shown with dashed-line bracket) that includes some contacts with phones (or other electronic devices) that also include the presence-based feature. In the detail view 1000-1, the top four contacts are providing the notification of the presence of the user associated with the contact (e.g., George is away, Susie and Marie are with people, and Ingrid is available) and the bottom two contacts are not providing the notification (e.g., because the contact has turned the presence-based feature off, the contact's phone does not support the presence-based feature, or for another reason). In a detail view 1000-2, the user 1002 selects the contact icon for Susie, and the presence-based function provides options 1006 for contacting Susie. As noted, Susie's notification indicates that other people are present with Susie, and the options 1006 may thus include sending a message (MESSAGE), calling now (CALL), or calling when Susie is no longer with other people (CALL WHEN ALONE).

In a detail view 1000-3, assume that the user 1002 selects the option 1006 to call when Susie is no longer with other people. Using the option 1006, both the user 1002 and Susie (shown as another user 1008) simultaneously receive a phone call when it's a good time to connect, illustrated by vibration indicators around the smartphone 102 and Susie's phone. In some implementations, how many contacts receive the notification, and which ones, may be user-selectable or based on a default setting. Additionally, the options 1006 may be user-selectable by the user 1008 (e.g., Susie) so that the user 1008 can determine which options a calling party (e.g., the user 1002) has when provided with the notification.

The presence-based function of providing a notification of the presence of the object within the awareness distance can also enhance remote collaboration tools, by broadcasting presence information or sending it to specific contacts. For example, in a document sharing application, the notification can help remote users determine whether another user is actually in front of the computer or just left the document-sharing application open. In some cases, the radar-based application 702 can provide additional details with the notification. For example, using additional sensors or features (e.g., a geo-location feature or a hands-free-for-driving feature), the notification may include information that allows the user to understand that the potential recipient of a call is in a car, driving (or not driving) and with other people. The radar-based application 702 can also suggest other methods of communication when the notification indicates the potential recipient is with others, such as by suggesting email as a way to avoid distracting a person who is with others (e.g., a person who may be in a meeting).

Figure 11:
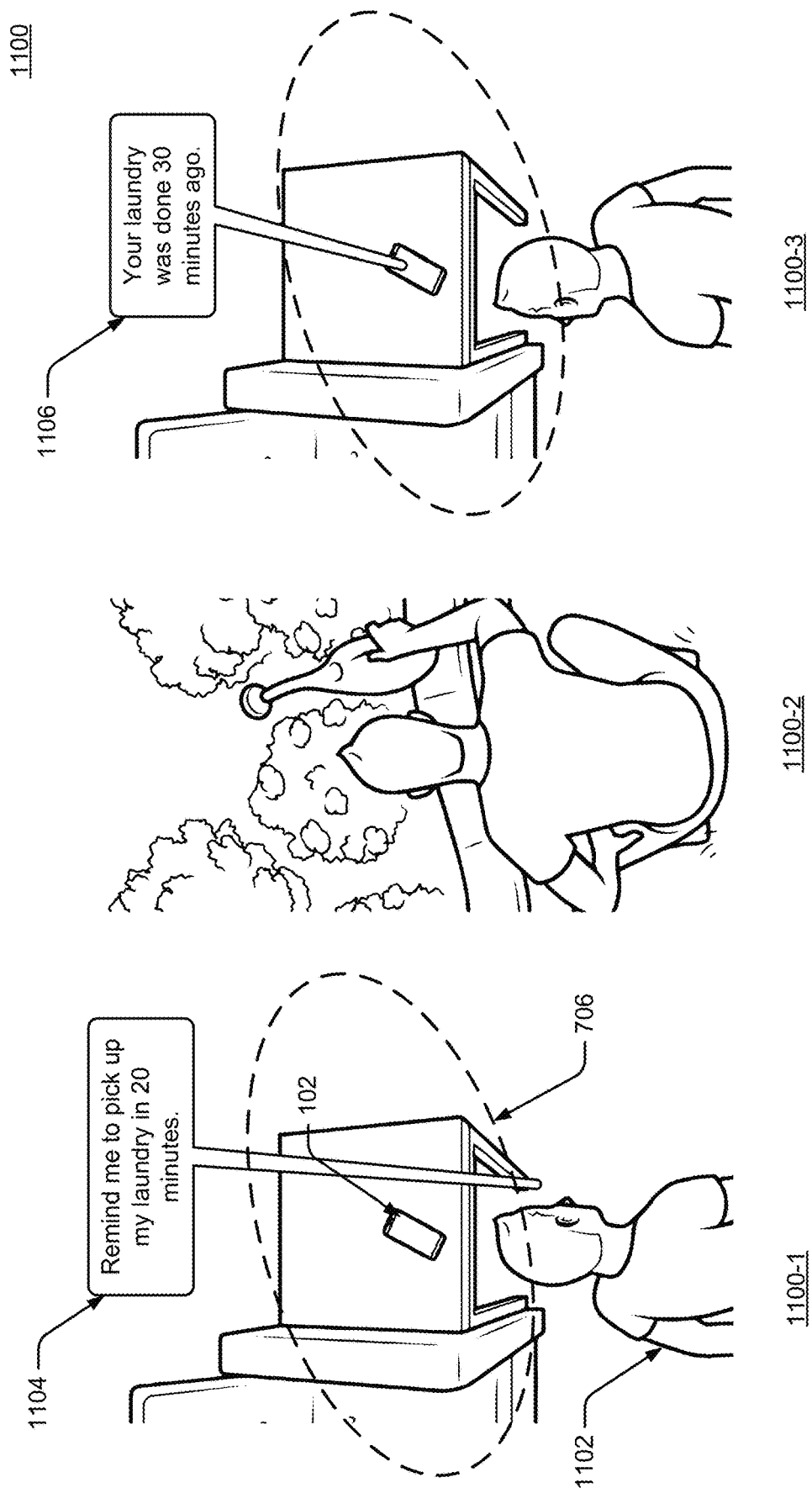

FIG. 11 illustrates an example 1100 in which the presence-based function is providing a notification of a previously presented reminder. In a detail view 1100-1, a user 1102 sets a reminder using a voice command (shown as a text bubble 1104) via an electronic assistant. In a detail view 1100-2, assume the user 1102 is doing chores at a location that is outside the awareness distance 706. During the time the user 1102 is outside the awareness distance 706, the time for the reminder passes and the reminder is presented while the user 1102 is away. In some implementations, because the smartphone 102 knows that the user is away, the reminder may not be presented at all, or the reminder may be presented at a lower volume or in a different mode (e.g., text rather than voice). In a detail view 1100-3, assume that the user 1102 returns 30 minutes after the reminder was supposed to have been presented. When the smartphone 102 determines that the user 1102 is within the awareness distance 706, the reminder is presented (shown as a text bubble 1106). In some implementations, the reminder may include additional information that can help the user 1102. For example, a suggestion to run the laundry through a clothes-dryer for a few minutes to reduce wrinkling, or a suggestion to change a restaurant reservation, and so forth.

FIG. 12 illustrates an example 1200 in which the presence-based function is providing an enhanced media experience. For example, wallpapers maps, and other digital content can include animations and depth. In a detail view 1200-1, a user 1202 is reading a book and then reaches for the smartphone 102. The display 108 automatically turns on and presents a short wallpaper animation 1204. In the detail view 1200-1, the wallpaper animation 1204 is a clock face that shows how long the user 1202 has been reading, but other wallpaper animations 1204 may be presented (a favorite movie clip, a user-recorded video, and so forth). The wallpaper animation 1204 may be any appropriate length (e.g., one, two, or three second), and may be user-selected or selected by the radar-based application 702. In some implementations, when the user 1202 withdraws the reached out hand, the wallpaper animation 1204 is displayed in reverse (e.g., the clock face of runs backward to display the time the user 1202 started reading). The radar-based application 702 can present other content based on a user's presence. For example, in a detail view 1200-2, a user 1206 is within the awareness distance 706 and, in response, the radar-based application 702 presents a favorite image 1208.

Further, using digital beamforming and other techniques, as described with reference to FIGS. 3-6, the radar system 104 can determine the user's viewing angle. The radar-based application 702 can then dynamically adjust the image presented on the display 108 to accommodate the user's point of view and thereby create an illusion of a three-dimensional space on the display 108. For example (not shown in FIG. 12), assume the user's smartphone is on a table and a three-dimensional (3D) object (a map, a sculpture, a building, and so forth) is presented on the display. When the user moves around the table, the presentation of the 3D object changes to accommodate the user's point of view, enriching the three-dimensional illusion by giving the user the appearance of moving around a real object. In some implementations, the user can rotate the device, rather than moving around a stationary device, and see the 3D object from different angles.

In other implementations, the smartphone 102 may determine, using for example, the radar-based application 702 or another entity, that more than one object is present at a same time the object 704 is within the awareness distance (e.g., determine a presence of another object within the awareness distance 706). In response, the radar-based application 702 can modify the presence-based function of the smartphone 102. Several examples of such implementations are described below, with reference to FIGS. 13 and 14.

FIG. 13 illustrates an example 1300 in which the modification of the presence-based function is an adjustment to a notification mode used by the smartphone 102, based on the presence of another object within the awareness distance 706. In a detail view 1300-1, a user 1302 and another user 1304 are sitting together at a table. Because the radar-based application 702 can determine that both the user 1302 and the other user 1304 are within the awareness distance 706, the radar-based application 702 modifies the notification mode of the smartphone 102. In some implementations, notifications may be completely silenced (e.g., nothing is presented on the display 108). In other implementations, as shown in the detail view 1300-1, the notification mode may be modified so that only notification indicators 1306 are displayed, rather than full notifications. For instance, an icon that indicates that a notification (e.g., notifications of calendar events, tasks, or other user-defined notifications) is available to view, rather than the notification itself. In this way, the smartphone 102 is less intrusive in a business or social situation, and potentially private information that may be displayed in full notifications is not publicly displayed.

The smartphone 102 may return to a default notification mode, or to a notification mode that was in operation prior to the other user 1304 entering the awareness distance 706, in a variety of ways. For example, as shown in a detail view 1300-2, the user 1302 may reach toward the smartphone 102 to return to the previous notification mode (as shown by an arrow 1308). Upon returning to the previous notification mode, the content 1310 of notifications received can be presented by the smartphone 102. In other implementations, a different 3D gesture may be used to return to the previous notification mode, or the smartphone may automatically return to the previous notification mode when it is determined that the other user 1304 is no longer within the awareness distance 706.

FIG. 14 illustrates an example 1400 in which the modification of the presence-based function is an adjustment to an electronic assistant mode used by the smartphone 102, based on the presence of another object within the awareness distance 706. For example, the electronic assistant may provide reminders and notifications that include potentially private information (e.g., a personal reminder or the content of a work-related event) when a user is alone, but restrict content when others are present.

Consider a detail view 1400-1, in which a user 1402 is alone, and within the awareness distance 706. Because the user 1402 is alone, the electronic assistant may use a voice interface to provide an audio reminder for the user 1402 to take medication (shown via a text bubble 1404, which indicates that another audio reminder will be provided in 10 minutes). Assume that a few minutes later (less than 10 minutes later), another user 1406 stops by for a visit, as shown in another detail view 1400-2. The other user 1406 sits down within the awareness distance 706 and the radar-based application 702 modifies the electronic assistant mode so that no audio is provided (as shown by a mute icon 1408). Rather than audio, the notification may be silenced until the other user 1406 leaves, or the reminder may be provided in another mode that provides more privacy, such as a vibrate mode, a text mode, or a notification indicator mode, as described with reference to FIG. 13.

In another example (not illustrated), the user 1402 may be viewing or listening to content when the other user 1406 enters the awareness distance 706. Even if the user 1402 does not notice that the other user 1406 has come within the awareness distance 706, the smartphone 102 (via the radar-based application or another entity, such as the voice assistant) can recognize the presence of the other user and temporarily pause or hide the content (e.g., in the case of private or confidential content).

In other implementations, including implementations of any of the examples above, the smartphone 102 (using the radar-based application 702 or another entity), can use the determination of whether the user is alone in combination with other sensors. For example, the smartphone 102 can use a microphone to determine an ambient noise level around the user. The smartphone 102 can then adjust volumes of phone ringtones, notifications, and the voice assistant volume to appropriate levels to attract the user's attention, based on both presence and the ambient noise level. Additionally, the radar-based application 702 may communicate with other sensors (e.g., the microphone) so that when another user's voice is detected (even if the other person is outside the awareness distance 706), the modifications to the presence-based features are still performed. Further, using the 3D gesture module 116 described above the smartphone 102 can cause, ringers, notifications, and the voice assistant become quieter (or are silenced completely) as the user reaches toward the smartphone 102, because the smartphone 102 can determine that the user's reach is a 3D gesture that indicates that the user is about to respond.

In yet other implementations, the smartphone 102 may determine (using the radar data) a 3D gesture by an object that is within the awareness distance and perform an action corresponding to the 3D gesture. The determination of the 3D gesture may be performed by a variety entities, such as the radar-based application 702 or the 3D gesture module 116, or by a combination of these or other entities. Several examples of such implementations are described below, with reference to FIGS. 15-20.

Figure 15:
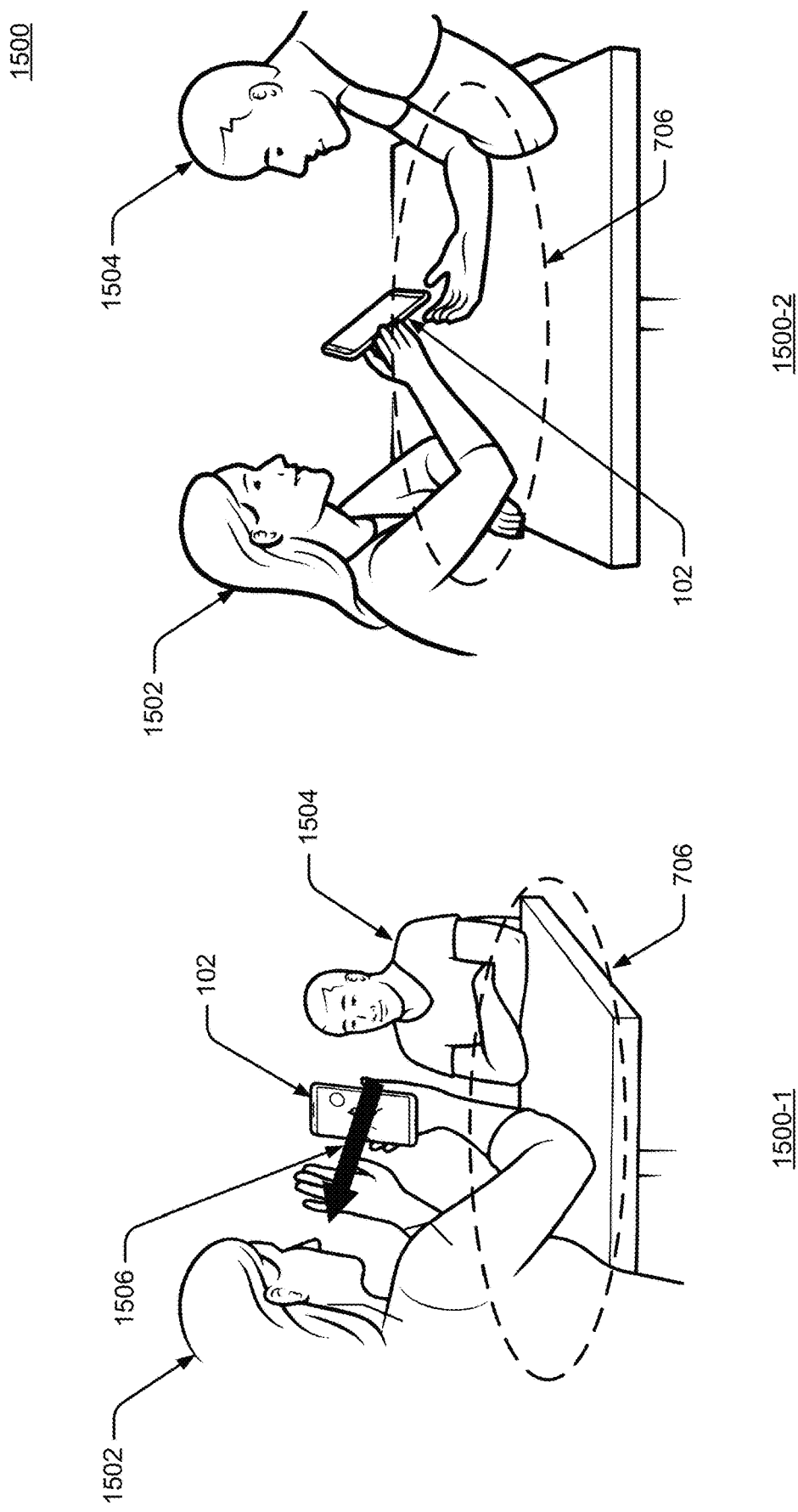

FIG. 15 illustrates an example 1500 in which the 3D gesture is a hand wave over the display of the smartphone 102 that activates a pinning mode, which locks content on the screen and blocks incoming notifications until a user exits the pinning mode. Sometimes, even when another person is within the awareness distance 706, the user may want to limit what information may be revealed to the other person. The techniques described in the example 1500 allow the user to share screen content with another person without exposing other content and the details of reminders and notifications.

In a detail view 1500-1, assume that a user 1502 wants to hand the smartphone 102 to another user 1504 to share a photograph. The user 1502 wants to protect personal information, such as other photos or content in reminders and notifications, from accidently being disclosed to the other user 1504. The user 1502 performs a right-to-left hand wave, as shown by an arrow 1506 and the radar-based application 702, or another entity, places the smartphone 102 into the pinning mode. The user 1502 can then pass the smartphone 102 to the other user 1504, as shown in another detail view 1500-2, with increased confidence that personal information will not be disclosed to the other user 1504.

In another implementation (not shown), the radar-based application 702 may automatically place the smartphone 102 into the pinning mode by using the radar data to determine that the device is being passed to another person. As noted, the radar system 104 can enable the radar-based application 702 to determine that two users are present. By determining the relative distance between the first user and the device, along with the orientation of the device with reference to both users, the pinning mode can be activated automatically, without an intentional gesture. As described, these techniques provide a way for user to employ easy and discreet 3D gestures to protect personal information while still allowing others to view selected content.

Figure 16:
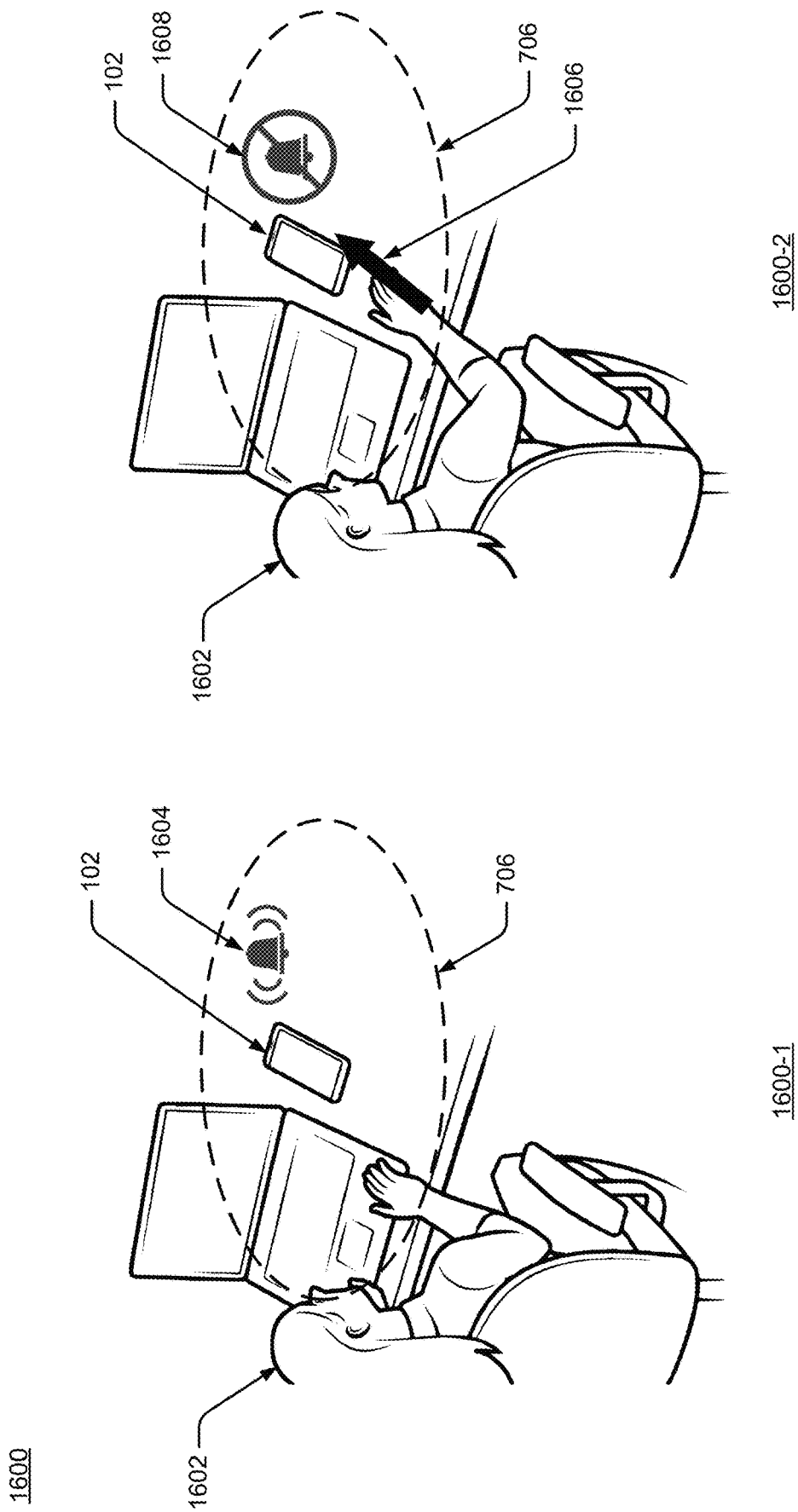

FIG. 16 illustrates an example 1600 in which the 3D gesture is reaching a hand toward the smartphone 102 to silence a ringer. As described above, the radar-based application 702 can adjust the ringer volume based on a distance between a user and the device. Sometimes, when the user is within the awareness distance 706, the user may want to silence the ringer before answering the call (or while determining who the caller is, without answering the call). In a detail view 1600-1, a user 1602 is sitting near the smartphone 102. The smartphone 102 is ringing, as shown by a ring-volume icon 1604. Assume that the user 1602 wants to silence the ringer before deciding whether to answer. As shown in a detail view 1600-2, the user 1602 reaches toward the smartphone 102, as shown by an arrow 1606. The radar-based application 702 determines the reach as the 3D gesture with a corresponding action of silencing the ringer (shown by a mute icon 1608). In this way, the techniques described in the example 1600 allow the user to silence the ringer by reaching for the phone, without having to answer the call or interact with the device controls.

FIG. 17 illustrates an example 1700 in which the 3D gesture is reaching a hand toward the smartphone 102 to exit a full-screen mode and access controls on a user interface. As described above, the radar-based application 702 can use the awareness distance 706 and attention cues to maintain an application in a particular mode (e.g., a full-screen mode without visible controls), even when the user is not interacting with the device. In some cases, when the user is within the awareness distance 706, the user may want to interact with controls for an application without picking up the device or tapping a menu.

In a detail view 1700-1, a user 1702 is sitting near the smartphone 102. In this example, assume that the user 1702 is watching a video and wants to pause the video. As shown in a detail view 1700-2, the user 1702 reaches toward the smartphone 102, as shown by an arrow 1704. The radar-based application 702 determines the reach as the 3D gesture with a corresponding action of exiting the full-screen mode and providing a user interface or other controls (shown by a pause icon 1706). In some implementations, if the user 1702 ends the 3D gesture (e.g., stops reaching and pulls back the hand), the full-screen mode resumes. As shown and described in the example 1700, these techniques allow the user to exit the full-screen mode and interact with the user interface by reaching for the phone, without having to tap or otherwise activate the user interface.

FIG. 18 illustrates an example 1800 in which the 3D gesture is reaching a hand toward the smartphone 102 to access camera controls after a photograph is properly framed. As described above, the radar-based application 702 can use the awareness distance 706 (not shown) and attention cues to maintain an application in a particular mode (e.g., a full-screen mode without visible controls). In some situations, many camera controls are unnecessary and only create obstructions and clutter on a display. Thus, a user within the awareness distance 706 may want to have a full-screen environment without controls for a period of time, such as when framing a photograph, and then interact with full controls after completing the framing.

In a detail view 1800-1, a user 1802 is framing a photograph of a sunset using a camera on the smartphone 102. In this example, assume that the user 1802 is trying frame the photograph to include particular landscape features, along with the sunset, and wants to frame the photograph in the full-screen mode with no controls (or minimal controls, such as shutter button 1804). As shown in the detail view 1800-1, the user 1802 using one hand to frame the photograph, so that more of the display is visible. In a detail view 1800-2, the user 1802 reaches toward the smartphone 102, as shown by an arrow 1806. The radar-based application 702 determines the reach as the 3D gesture with a corresponding action of providing a user interface or other controls, such as a cropping window 1808. In some implementations, if the user 1802 ends the 3D gesture (e.g., stops reaching and pulls back the hand), the full-screen mode resumes. In other implementations, the radar-based application 702 can determine that the user 1802 is only reaching to tap the shutter button 1804 (e.g., by determining where the user 1802 is reaching) and then present only the shutter button 1804, rather than all of the additional controls. As shown and described in the example 1800, these techniques allow the user to enjoy the full-screen mode for framing photographs and interact with the user interface by reaching for the phone, without having to tap or otherwise activate the user interface.

Figure 19:
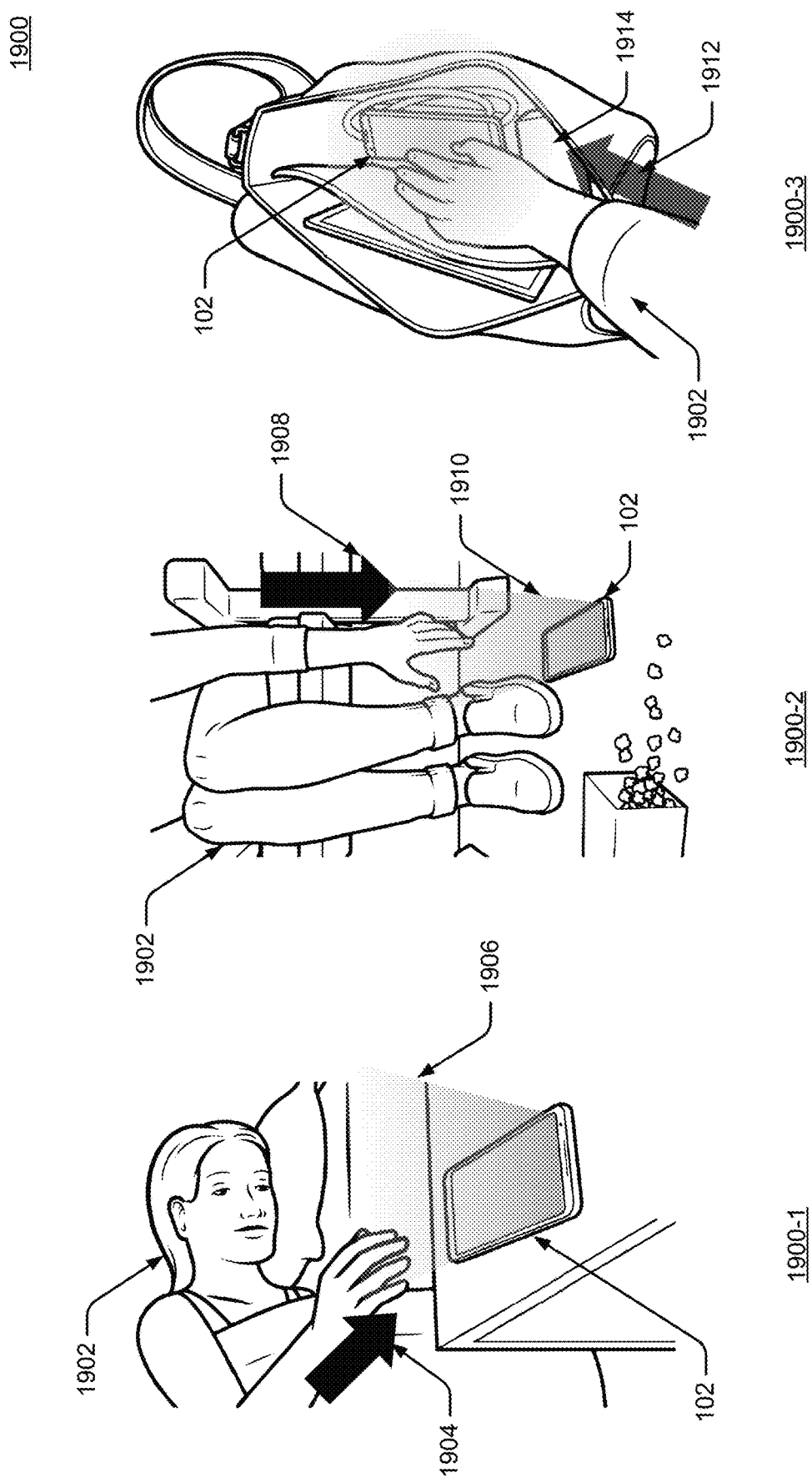

FIG. 19 illustrates an example 1900 in which the 3D gesture is reaching a hand toward the smartphone 102 to activate a backlight or other light source so that the smartphone 102 is easier to locate in a low-light environment. As described above, the radar-based application 702 can use the awareness distance 706 (not shown) and attention cues to maintain an application in a particular mode (e.g., a dim screen mode to save power). In some situations, a user may even want the screen completely off, such as in an intentionally dark environment. Thus, the user within the awareness distance 706 may have the screen of the smartphone 102 off or in the dim mode while sleeping or watching a movie, and then want a small amount of light to help locate the smartphone 102 in the dark environment.

In a detail view 1900-1, a user 1902 is preparing to go to sleep. In this example, assume that the user 1902 has forgotten to set an alarm and wants to find the smartphone 102 and set the alarm. As shown in the detail view 1900-1, the user 1902 reaches toward the smartphone 102 (shown by an arrow 1904). The radar-based application 702 determines the reach as a 3D gesture with a corresponding action of providing a dim light (e.g., a backlight), as shown by a shaded area 1906. In a detail view 1900-2, assume the user 1902 has dropped the smartphone 102 on the floor of a theater and cannot see it in the dark to retrieve it. The user 1902 reaches toward the smartphone 102 as shown by another arrow 1908. The radar-based application 702 again determines that the reach is a 3D gesture with a corresponding action of providing a light (shown by another shaded area 1910).

Similarly, in a detail view 1900-3, assume the user 1902 has placed the smartphone 102 in a bag. The user 1902 reaches toward the smartphone 102 as shown by another arrow 1912. The radar-based application 702 again determines that the reach is a 3D gesture with a corresponding action of providing a light (shown by another shaded area 1914). In some implementations, if the user ends the 3D gesture (e.g., stops reaching and pulls back the hand), the dim screen mode resumes. As shown and described in the example 1900, these techniques allow the user to use the dim screen mode to save power or reduce distractions caused by a bright screen in a dark environment and be able to locate the phone by reaching toward the phone. In other implementations (not illustrated), the radar-based application 702 determines that the reach is a 3D gesture, with a corresponding action of turning on a vibrate mode that gets stronger (e.g., vibrates with an increased frequency, amplitude, or both) as the user 1902 gets closer to the smartphone 102.

Additionally, the techniques described with reference to FIGS. 15-19, the 3D gesture may be used to provide other features not illustrated in FIGS. 17-19. For example, user interface elements in a browser, such as a navigation bar, may be provided when the user reaches for the smartphone 102 and then disappear when the user moves the hand away. In another example, a lock screen or home screen may automatically be presented when the user reaches toward the smartphone 102 (e.g., the user does not have to press a start or home button to display the lock screen). In other implementations, the smartphone 102 may detect the shape or orientation of the approaching hand, and change the interface accordingly. For example, the input surface may provide a touchpad interface when the user reaches with one hand (or with one finger extended) or provide a full keyboard when the user reaches with two hands.

In still other implementations, the smartphone 102 may use the radar-based application 702, or another entity, to determine that more than one object is present at a same time that the object 704 is within the awareness distance (e.g., determine a presence of another object within the awareness distance 706 at the same time that the object is within the awareness distance 706). In response to determining the presence of the objects within the awareness distance 706, the radar-based application 702 can determine 3D gestures (e.g., using the radar data) by the objects within the awareness distance and perform actions that correspond to the determined gestures. The smartphone 102 can also distinguish the objects from each other and keep track of which 3D gestures are made by which objects.

FIG. 20 illustrates an example 2000 in which the objects within the awareness distance 706 (not shown) are users playing games with the smartphone (in this case the smartphone 102) and the 3D gestures are used to control the game. Consider an example, illustrated in a detail view 2000-1, in which a user 2002 and a user 2004 are engaged in a two-player game on the smartphone 102. In the detail view 2000-1, the user 2004 makes a 3D gesture (shown by a left-to-right arrow 2006). In response to the 3D gesture, the radar-based application 702 can enable the game to perform an action corresponding to the 3D gesture (e.g., return an object in the game environment from across a center line, as shown on the display 108). In this way, the users 2002 and 2004 can control game play on the smartphone 102 without obscuring the view of the game.

In another example, illustrated in a detail view 2000-2, a user 2008 is engaged in a single-player game on the smartphone 102. In the detail view 2000-2, the user 2008 makes a 3D gesture (shown by a right-to-left arrow 2010), and the radar-based application 702 can enable the game to perform an action corresponding to the 3D gesture (e.g., move an object in the game environment from right to left). The radar-based application 702 can thereby use 3D gestures to interact with applications, such as games, without obstructing the users' view. In this way, because the radar-based application 702 can distinguish between multiple users and their gestures, which can expand the playing environment and provide a better and more-immersive multiplayer experience even on a single, small screen or device.

Example Methods

Figure 21:
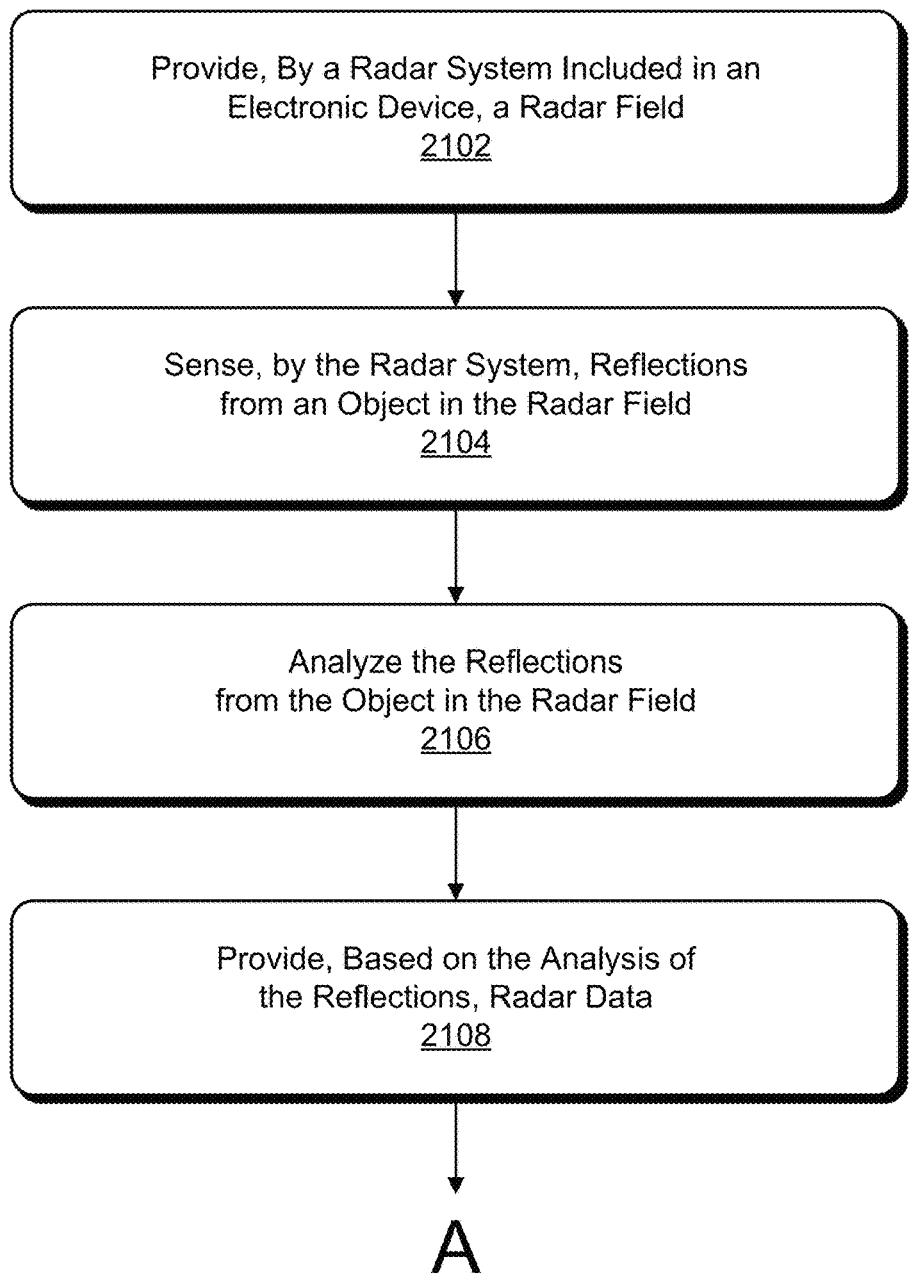
FIGS. 21 and 22 depict an example method enabling a smartphone providing radar-based proxemic context.
Figure 22:
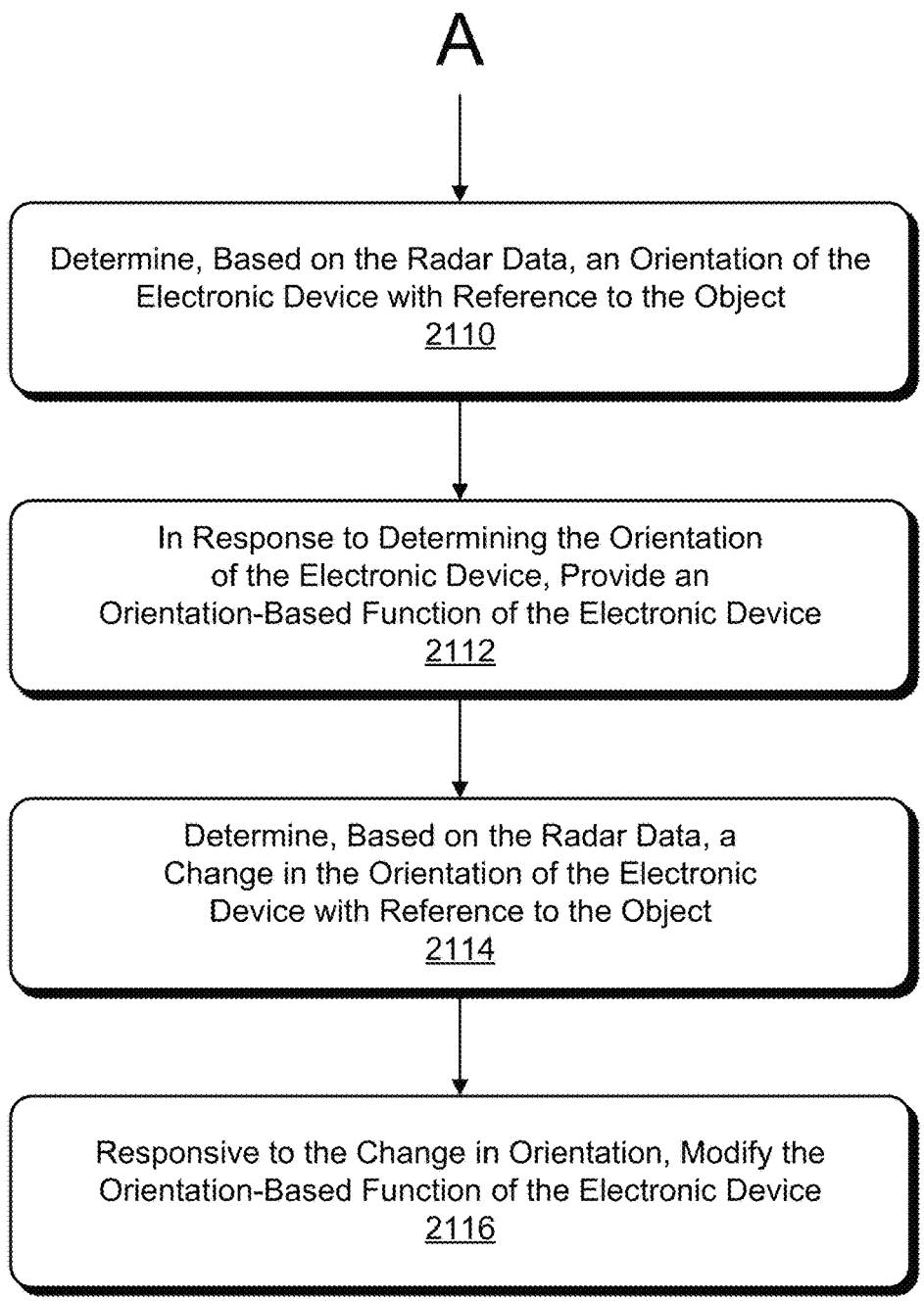

FIGS. 21 and 22 depict an example method 2100 enabling a smartphone providing radar-based proxemic context. The method 2100 can be performed with an electronic device that includes a radar system that provides a radar field (e.g., the smartphone 102 described above). The electronic device may also include a display, such as the display 108. The radar field can be used to determine an orientation of the electronic device with reference to an object in the radar field and provide an orientation-based function of the electronic device. The radar field can also be used to determine a change in the orientation of the electronic device and modify the orientation-based function, based on the changed orientation.

The method 2100 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-20, reference to which is made for example only. The techniques are not limited to performance by one entity or multiple entities operating on one device.

At 2102, a radar field is provided. The radar field can be provided by any of a variety of electronic devices (e.g., the smartphone 102 described above), that include a radar system (e.g., the radar system 104) and a radar-based application (e.g., either or both of the radar-based applications 106 or 702, which may include one or more of the orientation module 114, the 3D gesture module 116, or the presence module 708, and any combinations thereof). Further, the radar field may be any of a variety of types of radar fields, such as the radar field 110 described above.

At 2104, reflections from an object in the radar field are sensed by the radar system. The object may be any of a variety of objects, such as wood, plastic, metal, fabric, or organic material. For example, the object may be a person or a body part of a person (e.g., a hand), such as the objects 112 or 704 as described above.

At 2106, the reflections from the object in the radar field are analyzed. The analysis may be performed by any of a variety of entities (e.g., the radar system 104 or any of the radar-based applications described herein) and may include various operations or determinations, such as those described with reference to FIGS. 3-6.

At 2108, based on the analysis of the reflection, radar data, such as the radar data described above, is provided. The radar data may be provided by any of a variety of entities, such as the radar system 104 or any of the radar-based applications described herein. In some implementations, the radar system may provide the radar data and pass the radar data to other entities (e.g., any of the radar-based applications or other modules described with reference to FIGS. 1-20). The description of the method 2100 continues in FIG. 22, as indicated by the letter "A" after block 2108 of FIG. 21, which corresponds to the letter "A" before block 2110 of FIG. 22.

At 2110, an orientation of the electronic device, with reference to the object, is determined. The determination is based on the radar data and may be performed by any of a variety of entities, such as the radar system 104 or any of the radar-based applications or other modules described herein.

At 2112, in response to determining the orientation of the electronic device, an orientation-based function of the electronic device is provided. The orientation-based function may be provided by any of a variety of entities, such as the radar system 104, either of the radar-based applications 106 or 702, or any of the other modules described herein.

At 2114, a change in the orientation of the electronic device, with reference to the object, is determined. The determination is based on the radar data and may be performed by any of a variety of entities, such as the radar system 104, either of the radar-based applications 106 or 702, or any of the other modules described herein.

At 2116, in response to determining the change in the orientation of the electronic device with reference to the object, the orientation-based function is modified. The modification of the orientation-based function may be performed by any of a variety of entities, such as the radar system 104, either of the radar-based applications 106 or 702, or any of the other modules described herein.

As noted with reference to FIG. 1, one example of the orientation-based function is a do-not-disturb (DND) mode (e.g., a mode in which reminders, notifications, or other device-initiated communications are silenced). In this example, initial orientation that activates the DND mode may be a landscape orientation. It should be noted that the landscape orientation is with reference to where the user is, not a previous position of the electronic device. Thus, the user does not have to first orient the electronic device and then place it in the landscape mode. Instead, the user merely rotates the electronic device to a landscape orientation, and the DND mode is activated.

In this example, the change in the orientation of the electronic device with reference to the object is a rotation of the electronic device. The rotation may be within a plane that is substantially parallel to a viewing surface of the display 108 (e.g., a flat rotation on a surface). Again, the user does not have to pick up the electronic device in order for the change in orientation to be determined. Once the change in the orientation of the electronic device is determined to have put the electronic device into another orientation with reference to the object (e.g., a portrait orientation), the electronic device exits the DND mode. Once the DND mode is deactivated, any messages or notifications that were silenced are displayed so that the user can address them.

Figure 23:
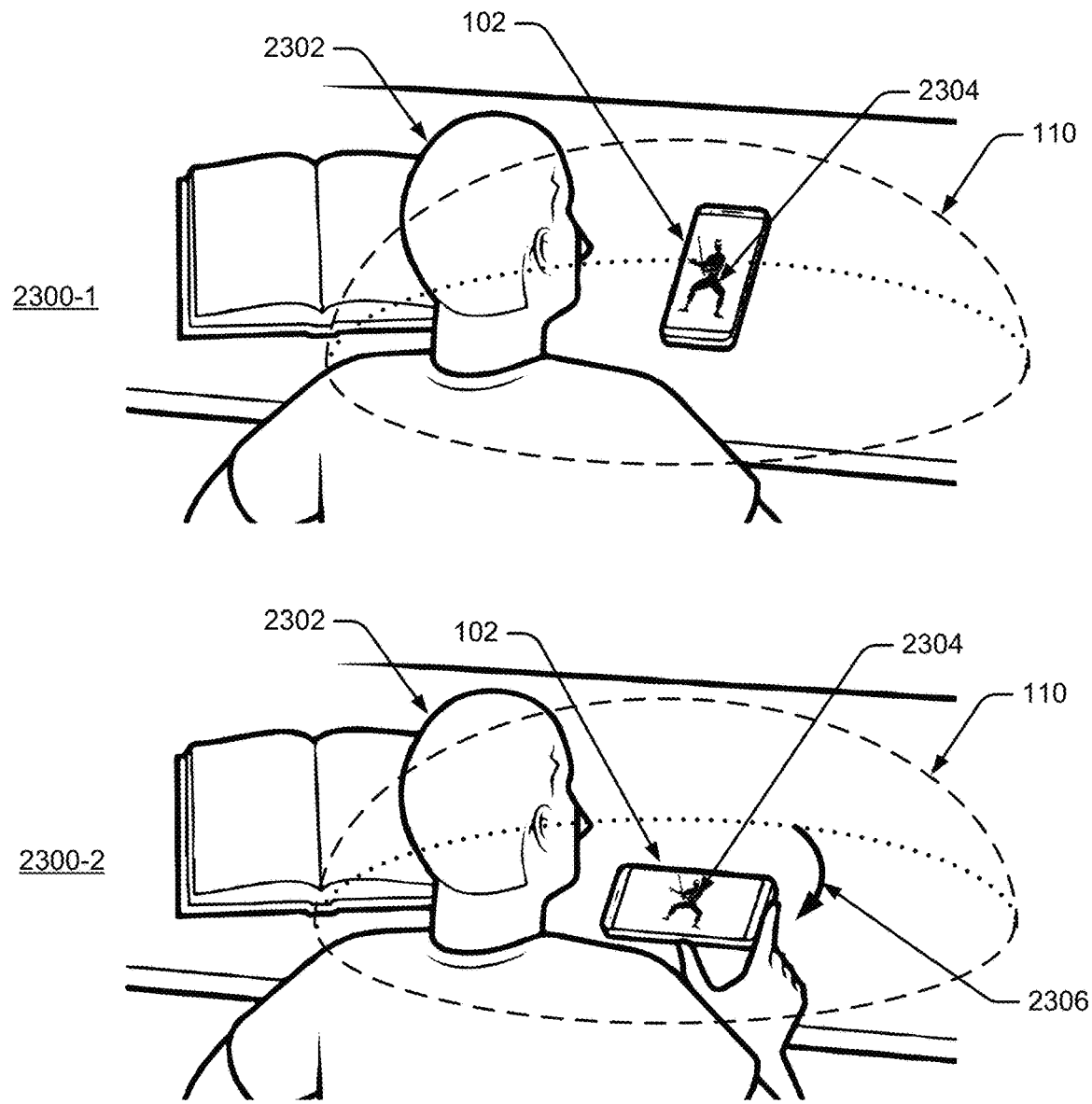
Figure 24:
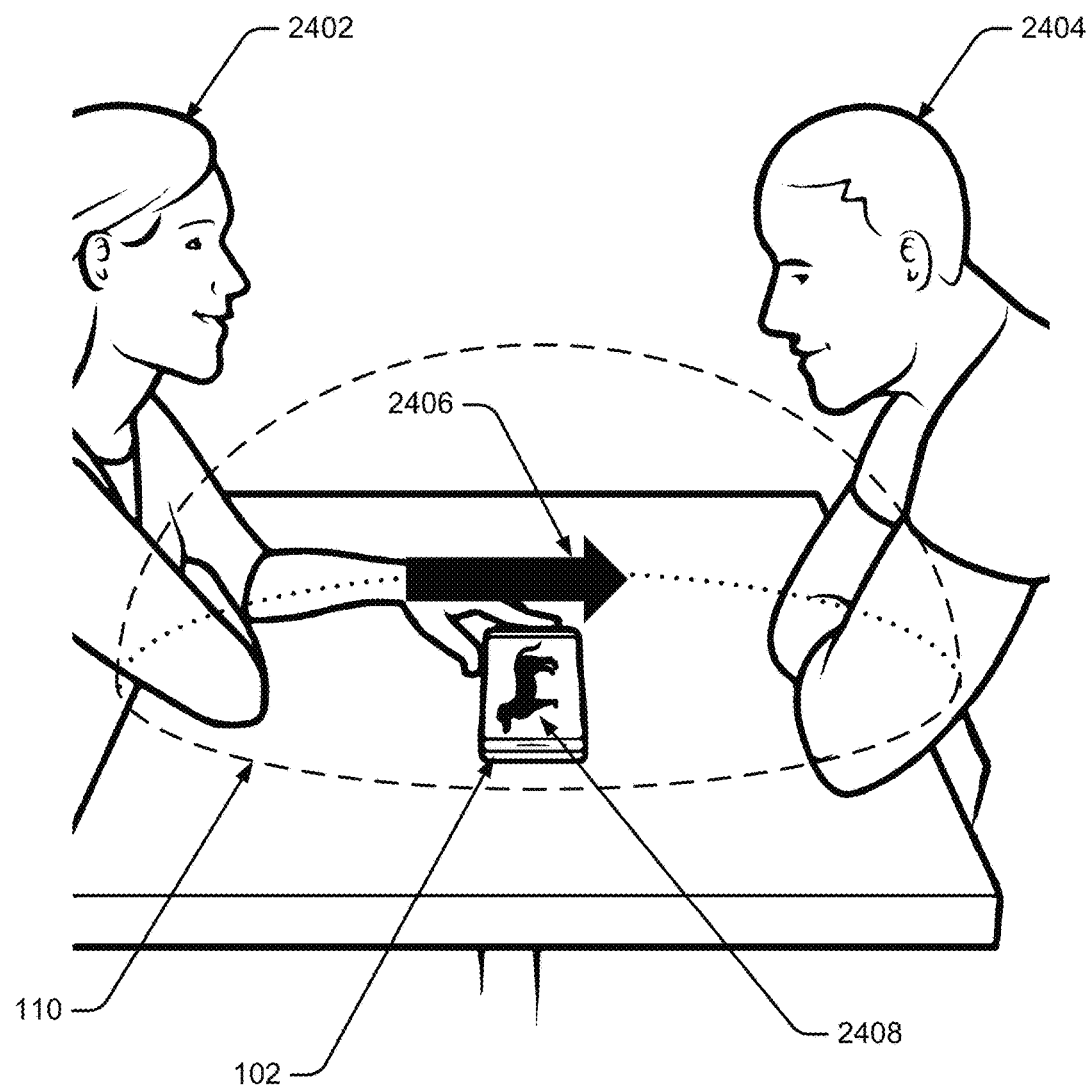

Consider the following additional examples, illustrated in FIGS. 23-25, which describe example implementations of the electronic device 102, which can implement additional details of the method 2100. In the examples described with respect to FIGS. 23-25, the described features and techniques are implemented in the smartphone 102, though the described features and techniques may be used with any of a variety of electronic devices (e.g., as described with reference to FIG. 2). FIG. 23 depicts an example implementation 2300 in which the orientation-based function of the smartphone 102 is to present content (e.g., via the display 108) in a user-facing orientation. In this example, the smartphone 102 is providing the radar field 110 (e.g., via the radar system 104). In a detail view 2300-1, a user 2302 (the object in the radar field) is viewing content on the smartphone 102 in a portrait orientation. The smartphone 102, (using, for example, the radar-based application 106) determines the orientation of the smartphone 102 with reference to the user 2302 and presents the content on the display in a user-facing orientation, as shown by a warrior image 2304.

In a detail view 2300-2, the user 2302 changes the orientation of the smartphone 102 to another orientation with reference to the user 2302 (e.g., a landscape orientation), as shown by an arrow 2306. In this example, the change in orientation is a flat rotation on a table on which the smartphone 102 is positioned (e.g., change in the orientation of the smartphone with reference to the user is a rotation of the smartphone within a plane that is substantially parallel to a viewing surface of the display 108). The smartphone 102 (using, for example, the radar-based application 106) can then determine that the change in the orientation has caused the smartphone 102 to be in another orientation with reference to the user 2302 and, in response, maintain the user-facing orientation of the content, while the smartphone is in the other orientation. Thus, the warrior image 2304 is maintained in the user-facing orientation of the detail view 2300-1, even though the smartphone 102 has been rotated and the user 2302 has neither picked up the device nor manually changed the orientation.

FIG. 24 depicts an example implementation 2400 in which the orientation-based function of the smartphone 102 is to present content (e.g., via the display 108) in an orientation facing a user that is looking at the display. In this way, the user can pass the smartphone to another user, who will automatically get an appropriately oriented display. In this example, the smartphone 102 is providing the radar field 110 (e.g., via the radar system 104). In this example, assume that a user 2402 and another user 2404 (e.g., the object in the radar field includes a first user and a second user) are viewing content on the smartphone 102 in a landscape orientation (e.g., a user-facing orientation). The smartphone 102, (using, for example, the radar-based application 106) determines the orientation of the smartphone 102 with reference to the user 2402 and presents the content on the display in the user-facing orientation with content oriented toward the user 2402 (this view is not shown in FIG. 24).

Continuing the example, assume that the user 2402 decides to let the other user 2404 look more closely at the content and moves the smartphone 102 toward the other user 2404, as shown by an arrow 2406 (e.g., the user 2402 changes the orientation of the smartphone 102, with reference to the user 2402, by causing a displacement of the smartphone 102, which causes the smartphone 102 to become farther from the first user and closer to the second user). The smartphone 102 (using, for example, the radar-based application 106) can then determine that the change in the orientation has caused the smartphone 102 to be in another orientation with reference to the user 2402 and, in response, present content 2408 on the display in an orientation facing the other user 2404. Thus, the content automatically orients to face the other user 2404, even though the smartphone 102 has not been rotated and the user 2402 has neither picked up the device nor manually changed the orientation.

FIG. 25 depicts an example implementation 2500 in which the radar-based application 106, or another entity, can use an attention cue to determine a content-display mode for presenting content on a display (e.g., the display 108) of the smartphone 102. The radar-based application 106 uses the attention cue to determine the orientation of the smartphone 102 with reference to the user 112 and also uses a change in the attention cue to determine a change in the orientation of the smartphone 102 with reference to the user 112. In this way, the attention cue can be used to determine whether the user 112 is paying attention to the smartphone 102.

The attention cue is a body posture or position of the user 112, such as leaning forward or backward, or turning left or right, which can be detected using the radar data, as described with reference to FIG. 1. For example, the radar data can be used to determine the attention cue by determining an angle of a torso or head of the user 112 with reference to a plane that is substantially parallel to a viewing surface (e.g., the viewing surface of a display) of the smartphone 102, such as a table on which the smartphone 102 is resting (e.g., the attention cue is whether the user 112 is leaning toward the smartphone 102) or an angular position of the torso or head of the user 112 (e.g., the attention cue is whether the user 112 is turned away from the smartphone 102), or a presence of the user 112 within a threshold distance of the smartphone 102.

In the example implementation 2500, the orientation-based function of the smartphone 102 is to present content on the display in a content-display mode that is based on the attention cue (e.g., a first content-display mode). The content-display mode may be any of a variety of modes the smartphone 102 may use while displaying or otherwise presenting content, such as a media pause mode or a media play mode, a lock-screen mode, a sleep or awake mode, a full-screen or slideshow mode, or include a particular screen brightness level or volume level.

In a detail view 2500-1, assume that the user 112 is listening to music through the smartphone 102 while reading a book. The first content-display mode in this example is a dimmed brightness level, as shown by a shaded area 2502 on the display of the smartphone 102. The attention cue in this example is an angular position of the head of the user 112, shown by a shaded arrow 2504, which indicates that the user 112 is looking at the book, not at the screen. In this way, the smartphone 102 can save battery power by automatically dimming the display while the user 112 is looking away, based on the attention cue, but continue to play music.

Continuing the example in another detail view 2500-2, the user 112 continues to listen to music, but has turned toward the smartphone 102, as shown by a curved arrow 2506. The turning of the user's 112 head indicates that the user 112 is now looking at the smartphone 102, rather than the book, as shown by another shaded arrow 2508. The turning of the user's 112 head is the change of the attention cue. In response to determining the change of the attention cue, the smartphone 102 (via the radar-based application 106 or another entity) can present content in another content-display mode (e.g., modify the orientation-based function of the smartphone 102 to present content in a second content-display mode). In the example 2500, the second content-display mode is presenting a user interface on the display, shown by a music icon 2510. The user 112 can interact with the user interface (e.g., via touch, voice, or 3D gesture input) to control the music player being used to play the music.

As noted, in some implementations, including implementations of the examples described above, the smartphone 102, using the radar-based application 106 or another entity, can determine that the rotation (e.g., rotation of the smartphone 102 or of the user's 112 torso or head) is effective to cause a modification of the orientation-based function if the rotation exceeds a threshold. The threshold may be any appropriate rotation, such as (25, 45, 90, or 180 degrees). Similarly, the displacement can be effective to cause the modification of the orientation-based function if the displacement causes the smartphone 102 to become at least a threshold distance farther from the first user. The threshold distance may be any appropriate distance, such as six, twelve, or eighteen inches. Further, the angle (e.g., the angle at which the user 112 leans forward or backward) can be effective to cause the modification of the orientation-based function if the angle exceeds a threshold angle. The threshold angle may be any appropriate angle, such as 15, 25, 35, or 45 degrees. The threshold rotation, distance, or angle may be predefined, user-selectable, or determined via a machine learning module that is included, or associated with, the radar system 104 or the radar-based application 106.

Additionally, position, angle, rotation, and other orientation changes may be effective to cause a modification of the orientation-based function if the change is maintained for at least a threshold time. The threshold time may be any appropriate time (e.g., 0.5, 1.5, or 2.5 seconds), and may be predefined, user-selectable, or determined via a machine learning module that is included, or associated with, the radar system 104 or the radar-based application 106.

It should be noted that these techniques for a smartphone providing radar-based proxemic context may be more secure than other techniques that may provide similar functionality. Not only are a user's position, orientation, or 3D gestures (especially user-defined gestures, micro-gestures, and posture- or position-based gestures) are not typically obtainable by an unauthorized person (unlike, for example, a password), but a radar image of the user, even if it includes the user's face, does not visually identify the user like a photograph or video does. Even so, further to the descriptions above, the user may be provided with controls allowing the user to make an election as to both whether and when any of the systems, programs, modules, or features described in this document may enable collection of user information (e.g., information about a user's social network, social actions or activities, profession, a user's preferences, or a user's current location), and whether the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user may have control over what information is collected about the user, how that information is used, and what information is provided to or about the user.

Example Computing System

Figure 26:
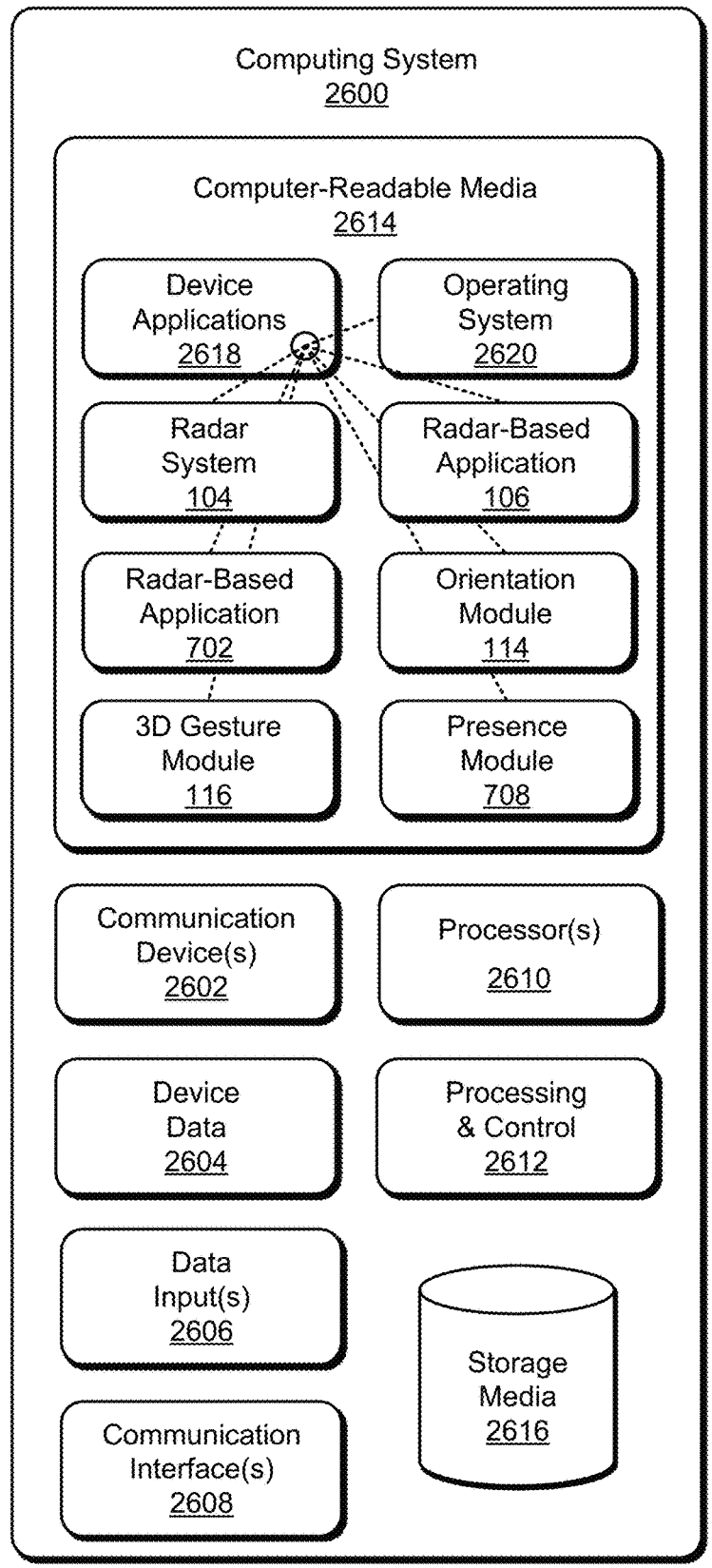
FIG. 26 illustrates various components of an example computing system that can be implemented as any type of client, server, and/or electronic device as described with reference to FIGS. 1-25 to implement, or in which techniques may be implemented that enable, a smartphone providing radar-based proxemic context.

FIG. 26 illustrates various components of an example computing system 2600 that can be implemented as any type of client, server, and/or electronic device as described with reference to the previous FIGS. 1-25 to implement, or in which techniques may be implemented that enable, a smartphone providing radar-based proxemic context.

The computing system 2600 includes communication devices 2602 that enable wired and/or wireless communication of device data 2604 (e.g., radar data, 3D gesture data, authentication data, reference data, received data, data that is being received, data scheduled for broadcast, data packets of the data). The device data 2604 or other device content can include configuration settings of the device, media content stored on the device, and/or information associated with a user of the device (e.g., a position, orientation, presence, or identity of a person within a radar field). Media content stored on the computing system 2600 can include any type of radar, biometric, audio, video, and/or image data. The computing system 2600 includes one or more data inputs 2606 via which any type of data, media content, and/or inputs can be received, such as human utterances, interactions with a radar field, touch inputs, user-selectable inputs (explicit or implicit), messages, music, television media content, recorded video content, and any other type of audio, video, and/or image data received from any content and/or data source. The data inputs 2606 may include, for example, the radar-based applications 106 and 702, the orientation module 114, the 3D gesture module 116, or the presence module 708.

The computing system 2600 also includes communication interfaces 2608, which can be implemented as any one or more of a serial and/or parallel interface, a wireless interface, any type of network interface, a modem, and as any other type of communication interface. The communication interfaces 2608 provide a connection and/or communication links between the computing system 2600 and a communication network by which other electronic, computing, and communication devices communicate data with the computing system 2600.

The computing system 2600 includes one or more processors 2610 (e.g., any of microprocessors, controllers, or other controllers) that can process various computer-executable instructions to control the operation of the computing system 2600 and to enable techniques for, or in which can be implemented, a smartphone providing radar-based proxemic context. Alternatively or additionally, the computing system 2600 can be implemented with any one or combination of hardware, firmware, or fixed logic circuitry that is implemented in connection with processing and control circuits, which are generally identified at 2612. Although not shown, the computing system 2600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 2600 also includes computer-readable media 2614, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 2600 can also include a mass storage media device (storage media) 2616.

The computer-readable media 2614 provides data storage mechanisms to store the device data 2604, as well as various device applications 2618 and any other types of information and/or data related to operational aspects of the computing system 2600. For example, an operating system 2620 can be maintained as a computer application with the computer-readable media 2614 and executed on the processors 2610. The device applications 2618 may include a device manager, such as any form of a control application, software application, signal-processing and control modules, code that is native to a particular device, an abstraction module, a gesture recognition module, and other modules. The device applications 2618 may also include system components, engines, or managers to implement a smartphone providing radar-based proxemic context, such as the radar system 104, the radar-based application 106, the radar-based application 702, the orientation module 114, the 3D gesture module 116, or the presence module 708. The computing system 2600 may also include, or have access to, one or more machine learning modules or systems.

CONCLUSION

Although implementations of techniques for, and apparatuses enabling, a smartphone providing radar-based proxemic context have been described in language specific to features and/or methods, it is to be understood that the subject of the appended claims is not necessarily limited to the specific features or methods described. Rather, the specific features and methods are disclosed as example implementations enabling a smartphone providing radar-based proxemic context.

What is claimed is:

1. An electronic device, comprising:
   a radar system, implemented at least partially in hardware, configured to:
     provide a radar field;
     sense reflections from a user in the radar field;
     analyze the reflections from the user in the radar field; and
     provide, based on the analysis of the reflections, radar data;
   one or more computer processors; and
   one or more computer-readable media having instructions stored thereon that, responsive to execution by the one or more computer processors, perform operations comprising:
     determining, based on a first subset of the radar data, a presence of the user within an awareness distance of the electronic device;
     determining, based on a second subset of the radar data, whether the user is alone within the awareness distance of the electronic device;
     responsive to determining that the user is within the awareness distance and whether the user is alone within the awareness distance of the electronic device, determining a proxemic context of the user; and
     providing the proxemic context of the user to one or more other electronic devices.

2. The electronic device of claim 1, wherein:
   the proxemic context of the user comprises a status of the user with respect to the electronic device; and the status of the user with respect to the electronic device includes:
available, the status of available indicating that the user is alone within the awareness distance of the electronic device;
busy, the status of busy indicating that the user is within the awareness distance of the electronic device and the user is not alone; or
away, the status of away indicating that the user is not within the awareness distance of the electronic device.

3. The electronic device of claim 2, wherein providing the proxemic context of the user to the one or more other electronic devices further comprises providing a status indicator that:
is configured to be displayed with the user's contact information on the one or more other electronic devices; and
indicates the status of the user with respect to the electronic device.

4. The electronic device of claim 3, wherein the operations further comprise providing, to the one or more other electronic devices, selectable controls configured to be displayed with the user's contact information, the selectable controls including at least one of:
a first selectable control configured to cause the one or more other electronic devices to send a message to the electronic device;
a second selectable control configured to cause the one or more other electronic devices to place a call to the electronic device;
a third selectable control configured to cause the one or more other electronic devices to place a call to the electronic device when the status of the user with respect to the electronic device changes from busy or away to available; or
a fourth selectable control configured to cause the electronic device and the one or more other electronic devices to simultaneously receive calls from each other when the status of the user with respect to the electronic device changes from busy or away to available.

5. The electronic device of claim 4, wherein providing, to the one or more other electronic devices, selectable controls configured to be displayed with the user's contact information further comprises providing one or more of the first selectable control, the second selectable control, the third selectable control, or the fourth selectable control, based on user input through the electronic device.

6. The electronic device of claim 2, wherein providing the proxemic context of the user to the one or more other electronic devices further comprises communicating the proxemic context using a text message to the one or more other electronic devices.

7. The electronic device of claim 6, wherein the text message includes selectable controls usable for contacting the user, the selectable controls including at least one of:
a first selectable control configured to cause the one or more other electronic devices to send a message to the electronic device;
a second selectable control configured to cause the one or more other electronic devices to place a call to the electronic device;
a third selectable control configured to cause the one or more other electronic devices to place a call to the electronic device when the status of the user with respect to the electronic device changes from busy or away to available; or
a fourth selectable control configured to cause the electronic device and the one or more other electronic devices to simultaneously receive calls from each other when the status of the user with respect to the electronic device changes from busy or away to available.

8. The electronic device of claim 7, wherein communicating the proxemic context using the text message to the one or more other electronic devices further comprises determining, based on user input through the electronic device, that one or more of the first selectable control, the second selectable control, the third selectable control, or the fourth selectable control are to be included in the text message.

9. The electronic device of claim 1, wherein the operations further comprise:
determining, based on a user input, the one or more other electronic devices that are provided the proxemic context of the user; or
determining, based on a default setting of the electronic device, the one or more other electronic devices that are provided the proxemic context of the user.

10. The electronic device of claim 1, wherein:
the second subset of the radar data and the first subset of the radar data are a same subset of the radar data;
the second subset of the radar data does not include radar data of the first subset of the radar data; or
the second subset of the radar data includes at least a portion of the first subset of the radar data.

11. An electronic device, comprising;
one or more computer processors; and
one or more computer-readable media having instructions stored thereon that, responsive to execution by the one or more computer processors, perform operations comprising:
receiving, from another electronic device that includes a radar system, a proxemic context of a user of the other electronic device, the proxemic context of the user determined based on one or more subsets of radar data provided by the radar system and comprising a status of the user with respect to the other electronic device; and
presenting, on a display of the electronic device and associated with the user's contact information, a status indicator that indicates the status of the user with respect to the other electronic device.

12. The electronic device of claim 11, wherein the status of the user with respect to the other electronic device includes:
available, the status of available indicating that the user is alone within an awareness distance of the other electronic device;
busy, the status of busy indicating that the user is within the awareness distance of the other electronic device and the user is not alone; or
away, the status of away indicating that the user is not within the awareness distance of the other electronic device.

13. The electronic device of claim 11, wherein presenting the status indicator further comprises displaying the status indicator with the user's contact information on the display of the electronic device.

14. The electronic device of claim 13, wherein displaying the status indicator with the user's contact information on the display of the electronic device further comprises displaying selectable controls for contacting the user, the selectable controls displayed with the user's contact information and including at least one of:

a first selectable control that when selected causes the electronic device to send a message to the other electronic device;

a second selectable control that when selected causes the electronic device to place a call to the other electronic device;

a third selectable control that when selected causes the electronic device to place a call to the other electronic device when the status of the user with respect to the other electronic device changes from busy or away to available; or a fourth selectable control that when selected causes the electronic device and the other electronic device to simultaneously receive calls from each other when the status of the user with respect to the other electronic device changes from busy or away to available.

15. The electronic device of claim 11, wherein the one or more subsets of radar data are subsets of radar data that are provided by the radar system of the other device, the radar system implemented at least partially in hardware, and configured to: provide a radar field, sense reflections from the user in the radar field, analyze the reflections from the user in the radar field, and provide, based on the analysis of the reflections, the radar data.

16. A method implemented in an electronic device that includes a radar system, the method comprising:

providing, by the radar system, a radar field;

sensing, by the radar system, reflections from a user in the radar field;

analyzing the reflections from the user in the radar field;

providing, based on the analysis of the reflections, radar data;

determining, based on a first subset of the radar data, a presence of the user within an awareness distance of the electronic device;

determining, based on a second subset of the radar data, whether the user is alone within the awareness distance of the electronic device;

responsive to determining that the user is within the awareness distance and whether the user is alone within the awareness distance of the electronic device, determining a proxemic context of the user; and providing the proxemic context of the user to one or more other electronic devices.

17. The method of claim 16, wherein the proxemic context of the user comprises a status of the user with respect to the electronic device and the status of the user with respect to the electronic device includes:

available, the status of available indicating that the user is alone within the awareness distance of the electronic device;

busy, the status of busy indicating that the user is within the awareness distance of the electronic device and the user is not alone; or away, the status of away indicating that the user is not within the awareness distance of the electronic device.

18. The method of claim 17, wherein providing the proxemic context of the user to one or more other electronic devices further comprises providing a status indicator that is configured to be presented with the user's contact information on respective displays of the one or more other electronic devices and indicates the status of the user with respect to the electronic device, and the method further comprises:

providing, to the one or more other electronic devices, selectable controls configured to be displayed with the user's contact information, the selectable controls including at least one of:

a first selectable control configured to cause the one or more other electronic devices to send a message to the electronic device;

a second selectable control configured to cause the one or more other electronic devices to place a call to the electronic device;

a third selectable control configured to cause the one or more other electronic devices to place a call to the electronic device when the status of the user with respect to the electronic device changes from busy or away to available; or a fourth selectable control configured to cause the electronic device and the one or more other electronic devices to simultaneously receive calls from each other when the status of the user with respect to the electronic device changes from busy or away to available.

19. The method of claim 17, wherein:

the electronic device includes a non-radar sensor; and the status of the user with respect to the electronic device also includes a status of mobile, the status of mobile determined based at least in part on data from the non-radar sensor and indicating that the user in not alone and traveling in a vehicle.

20. The method of claim 19, wherein the non-radar sensor comprises at least one of a geo-location sensor or a detection sensor that can detect when the electronic device is operating in a hands-free driving mode.

* * * * *